US006839898B2

(12) United States Patent
Saji et al.

(10) Patent No.: US 6,839,898 B2
(45) Date of Patent: Jan. 4, 2005

(54) DISK DRIVE

(75) Inventors: Yoshito Saji, Nishinomiya (JP);
Masahiro Inata, Itami (JP); Shinichi Wada, Ehime (JP); Hidehiko Ohta, Ehime (JP); Kengo Masaoka, Matsuyama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 298 days.

(21) Appl. No.: 10/134,159

(22) Filed: Apr. 26, 2002

(65) Prior Publication Data
US 2002/0159373 A1 Oct. 31, 2002

(30) Foreign Application Priority Data
Apr. 27, 2001 (JP) ......................................... 2001-131409

(51) Int. Cl.[7] .............................................. G11B 17/04
(52) U.S. Cl. ..................................................... 720/619
(58) Field of Search ............................... 369/77.1, 77.2, 369/75.1, 75.2; 360/99.02

(56) References Cited
U.S. PATENT DOCUMENTS

| 4,700,338 A | * | 10/1987 | Sugihara et al. ........... 369/77.1 |
| 4,764,917 A | * | 8/1988 | Sugihara et al. ........... 369/77.1 |
| 5,022,023 A | * | 6/1991 | Toyoguchi .................. 369/77.1 |
| 5,166,917 A | * | 11/1992 | Decoster et al. ........... 369/77.1 |
| 5,173,894 A | * | 12/1992 | Kido .......................... 369/77.1 |
| 5,226,028 A | * | 7/1993 | Yamada et al. ............ 369/77.1 |
| 5,416,763 A | * | 5/1995 | Ohsaki ....................... 369/77.1 |
| 6,301,215 B1 | * | 10/2001 | Otsuki et al. .............. 369/77.2 |
| 6,327,239 B1 | * | 12/2001 | Shirashima et al. ........ 369/192 |

FOREIGN PATENT DOCUMENTS

JP          07-220353          8/1995

* cited by examiner

Primary Examiner—William Klimowicz
Assistant Examiner—Mark Blouin
(74) Attorney, Agent, or Firm—Akin Gump Strauss Hauer & Feld, LLP

(57) ABSTRACT

A disk drive includes base with a spindle motor, first and second rockers and first and second sliders. The spindle motor has a turntable to mount a disk. The first and second rockers rock substantially parallelly to the turntable. The first rocker pulls in the disk, inserted externally, to a position where the disk and motor have their centers aligned. The second rocker unloads the disk from the position to a point where the disk is exposed partially. The first and second sliders are engaged with the first and second rockers to make them pull in and unload the disk, respectively, and reciprocate substantially parallelly to the turntable. The rockers and sliders are located under the turntable. The slider(s) support(s), raise(s) and lower(s) a side face of the base through the reciprocation.

14 Claims, 13 Drawing Sheets

DISK DRIVE

BACKGROUND OF THE INVENTION

1. Field of the Invention

The present invention relates to a disk drive for reading and/or writing information from/on a disk storage medium such as a CD or a DVD. More particularly, the present invention relates to a disk drive of a so-called "slot-in" type into/from which the user can externally load and automatically unload a disk directly.

2. Description of the Related Art

A conventional disk drive includes a tray for use to load and unload a disk into/from the disk drive. In operating a disk drive of this type, the user gets the tray drawn out, mounts a disk on the tray, and then gets the tray inserted along with the disk, thereby loading the disk into the disk drive.

Another conventional disk drive requires the user to open and close a disk loading/unloading lid or cover to mount and dismount a disk directly on/from a turntable.

On the other hand, a disk drive of a different type, having a mechanism that does not require the user to get the tray drawn out and inserted or open and close the lid, has also been gradually popularized to meet the convenience of the user more fully. A disk drive of a slot-in type (also called a "slot-loading type") is one of such disk drives including a mechanism like this.

A slot-in type disk drive includes a slot for use to load and unload a disk into/from the disk drive. When the user inserts a disk halfway into the slot, the disk drive automatically pulls the disk in and mounts it on the turntable thereof. Also, in accordance with a user's instruction, the disk loaded is automatically ejected through the slot. For example, the disk drive disclosed in Japanese Laid-Open Publication No. 7-220353 includes transport rollers with an axial length greater than the regular disk diameter and a fixed guide. The disk drive sandwiches the inserted disk between the transport rollers and the guide, and transports the disk by turning the rollers.

Recently, various electronic appliances are increasingly required to further reduce their sizes and thicknesses. To meet these demands, a disk drive as a peripheral unit to be built in these appliances also needs to further reduce its size and thickness.

The conventional slot-in type disk drive, however, needs the transport rollers having the axial length greater than the disk diameter. Accordingly, the disk drive of that type should have an increased width. Also, the guide to be disposed over the upper surface of the disk inserted should have a constant thickness to define the disk transporting direction precisely. Furthermore, a clamper for holding the disk thereon should also be disposed over the upper surface of the disk inserted. Thus, it is difficult to further reduce the size and thickness of the conventional slot-in type disk drive.

SUMMARY OF THE INVENTION

In order to overcome the problems described above, an object of the present invention is to provide a slot-in type disk drive of a reduced size and thickness.

A disk drive according to the present invention includes base with a spindle motor, first and second rockers and first and second sliders. The spindle motor has a turntable to mount a disk thereon. The first rocker rocks substantially parallelly to the turntable and pulls in the disk, which has been inserted externally, to an internal position where the center of the disk is aligned with that of the spindle motor. The second rocker also rocks substantially parallelly to the turntable and unloads the disk from the internal position to a point where the disk is exposed at least partially. The first and second sliders are engaged with the first and second rockers to make the first and second rockers pull in and unload the disk, respectively, and reciprocate in two directions substantially parallel to the turntable. In this disk drive, the first and second rockers and the first and second sliders are all located under the turntable, and at least one of the first and second sliders supports a side face of the base and raises and lowers the side face by reciprocating in the two directions.

In one preferred embodiment of the present invention, the disk drive further includes a slider coupling for coupling the first and second sliders together, thereby getting the first and second sliders interlocked with each other and allowing the first and second sliders to reciprocate in the two directions.

In this particular preferred embodiment, the slider coupling is preferably located under the turntable.

More specifically, while the disk is mounted on the turntable, the first and second rockers and the slider coupling are preferably located at such positions as not interfering with first and/or second slider's raising or lowering the base.

In another preferred embodiment of the present invention, the base includes a protrusion on the side face thereof. In that case, the at least one of the first and second sliders preferably includes a cam groove for guiding the protrusion in such a manner as to raise and lower the side face by reciprocating in the two directions.

In still another preferred embodiment, the first and second sliders support two opposed side faces of the base, respectively, and raise and lower the two side faces by reciprocating in the two directions.

In yet another preferred embodiment, the disk drive further includes a protrusion near the spindle motor. In that case, as the side face of the base is raised and lowered, at least part of the turntable is preferably located either above or below the top of the protrusion near the spindle motor.

In yet another preferred embodiment, the first and second sliders are disposed beside the base so as to interpose the base between them. When the disk is inserted through one side of the base, the slider coupling is preferably located on the other side of the base that faces the one side.

In yet another preferred embodiment, the disk is transported by the first and second rockers in a direction substantially parallel to the directions in which the first and second sliders reciprocate. When the first or second slider is pressed externally, the disk is preferably unloaded by the second slider.

In yet another preferred embodiment, the disk drive further includes an outer casing that includes: a first space in which the base is stored; a notched portion that is adjacent to the first space and that extends in the directions in which the first and second sliders reciprocate; and a second space that is provided over the first space and the notched portion and that allows the disk to rotate therein. In that case, the first rocker is preferably rotated in the second space located over the notched portion.

In this particular preferred embodiment, the spindle motor includes a hub that engages with a center hole of the disk, and the outer casing includes a convex portion, which forms a space that will receive a portion of the hub when the base is raised.

In yet another preferred embodiment, the disk drive further includes a reversible spring that applies a force to the second rocker to rotate the second rocker bidirectionally on the axis thereof. When at least the second rocker is disengaged from the second slider, the reversible spring preferably applies the force to the second rocker to rotate the second rocker to a direction in which the disk is unloaded.

In yet another preferred embodiment, the disk drive further includes: a driver for moving at least one of the first and second sliders; and a driver support for supporting the driver near the base. The driver support preferably includes a leaf spring for applying a force to the base in such a direction that the protrusion on the side face of the base comes into contact with the cam groove of the first or second slider.

In yet another preferred embodiment, the base includes a partition that has a height approximately equal to that of the spindle motor. When the disk is mounted on the turntable, the partition is preferably located outside of the projection area of the disk and near a disk inserting slot.

In yet another preferred embodiment, in loading the disk, the disk drive slides the first slider in a first direction and the second slider in a second direction opposite to the first direction, respectively, makes the first rocker pull in the disk to the internal position while the first and second sliders are being slid, and raises the base, thereby mounting the disk on the turntable. On the other hand, in unloading the disk, the disk drive preferably slides the first and second sliders in the second and first directions, respectively, and lowers the base while the first and second sliders are being slid, thereby dismounting the disk from the turntable and getting the disk ejected by the second rocker.

In yet another preferred embodiment, the disk drive further includes an insertion guide for regulating the angle of the disk being inserted externally and thereby guiding the disk in such a manner that the disk does not come into contact with any of the members on the base.

In this particular preferred embodiment, the insertion guide includes a guide periphery in an arched shape that matches with the outer periphery of the disk that has been mounted on the turntable.

Alternatively, the second rocker may have such a shape as regulating the angle of the disk being inserted externally and thereby guiding the disk in such a manner that the disk does not come into contact with any of the members on the base.

In yet another preferred embodiment, the second rocker is engaged with, and driven by, the second slider until the disk being unloaded reaches the point where the disk is exposed at least partially.

In this particular preferred embodiment, in loading the disk, the disk drive slides, for a distance A, the first slider in a first direction and the second slider in a second direction opposite to the first direction, respectively, makes the first rocker pull in the disk to the internal position while the first and second sliders are being slid, and raises the base, thereby mounting the disk on the turntable. On the other hand, in unloading the disk, the disk drive preferably slides, for a distance A+$\alpha$, the first and second sliders in the second and first directions, respectively, and lowers the base while the first and second sliders are being slid, thereby dismounting the disk from the turntable and getting the disk ejected by the second rocker. After the disk has been ejected, the disk drive preferably slides, for a distance $\alpha$, the first and second sliders in the first and second directions, respectively, without moving the second rocker, thereby recovering its initial state.

In this particular preferred embodiment, the second rocker is disposed at such a position as pushing back a second disk that has been inserted into the disk drive by mistake. The second disk has a diameter two-thirds as long as a regular diameter of the disk.

In that case, the disk drive preferably further includes a first sensor for sensing whether the disk has been pulled in and whether the disk has been mounted on the turntable. The first sensor preferably further senses whether the disk has been ejected or whether the disk drive has recovered its initial state.

In yet another preferred embodiment, the disk drive further includes a supporting inner casing that supports the slider coupling in such a position that the slider coupling is rotatable within a predetermined plane.

In this particular preferred embodiment, the supporting inner casing is disposed under the turntable and secured to the outer casing.

More specifically, the supporting inner casing preferably is elongated vertically to the directions in which the first and second sliders are slid and two ends of the supporting inner casing in a longitudinal direction thereof are preferably bent downward.

In yet another preferred embodiment, the disk drive further includes: a disk guide, which is disposed so as to face the first rocker with the disk interposed between the disk guide and the first rocker and to regulate the directions in which the disk is transported; and a third rocker for pressing the outer periphery of the disk against the first rocker and the disk guide. The disk is preferably positioned on the spindle motor by bringing the disk into contact with the disk guide and the first rocker.

In this particular preferred embodiment, the disk guide is disposed so as to avoid contact with the disk being inserted and interlocked with the second slider in such a manner as to come into contact with the disk, and position the disk on the spindle motor, while the disk is being pulled in, and to separate from the disk after the disk has been mounted on the spindle motor.

In that case, even if the disk drive is disposed so that the disk guide is located under the disk being inserted, the disk guide is still interlocked with the second slider in such a manner as to hold the disk thereon and position the disk on the spindle motor.

Also, even if the disk drive is disposed so that the third rocker is located under the disk being inserted, the third rocker still applies a force to the disk in such a direction as to press the disk against the first rocker and the disk guide.

In yet another preferred embodiment, the third rocker is interlocked with the slider coupling and separated from the disk after the disk has been mounted on the turntable.

In yet another preferred embodiment, the disk drive further includes a disk insertion sensor for detecting the operation of the third rocker, being rotated by the disk being inserted, when the disk reaches a predetermined position. In response to a detection signal supplied from the disk insertion sensor, the first and second sliders preferably start to pull in the disk.

In this particular preferred embodiment, the third rocker is interlocked with the slider coupling, and the disk drive moves the third rocker back to its home position by moving the slider coupling while the disk is being unloaded.

Other features, elements, processes, steps, characteristics and advantages of the present invention will become more apparent from the following detailed description of preferred

BRIEF DESCRIPTION OF THE DRAWINGS

FIG. 10B is a plan view illustrating a portion of the first slider to a larger scale; and FIGS. 10C and 10D are plan views illustrating respective portions of the second slider to a larger scale.

DETAILED DESCRIPTION OF PREFERRED EMBODIMENTS

Embodiment 1

Figure 1A:
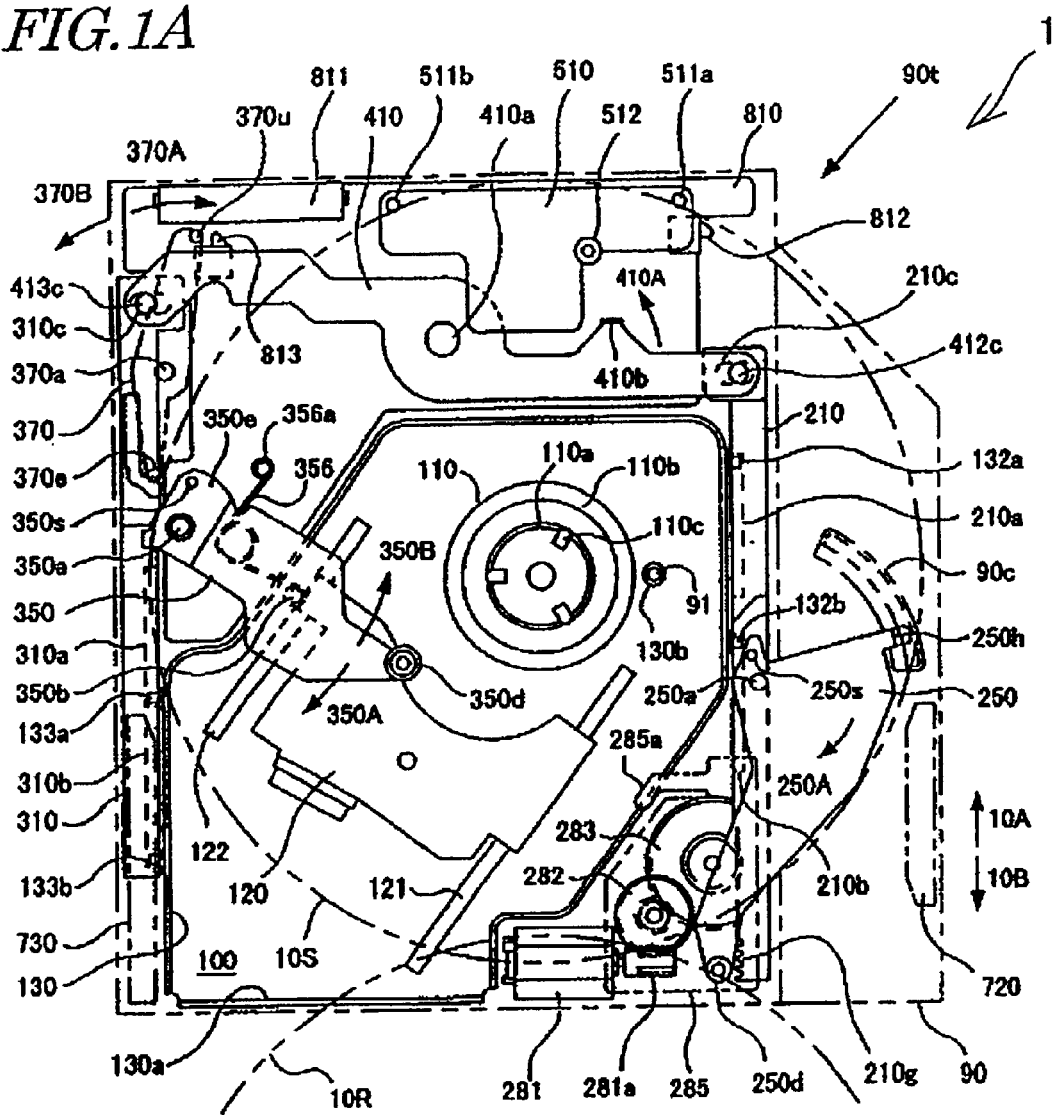
FIG. 1A is a plan view illustrating an overall arrangement for a disk drive according to a first specific preferred embodiment of the present invention.
Figure 1B:
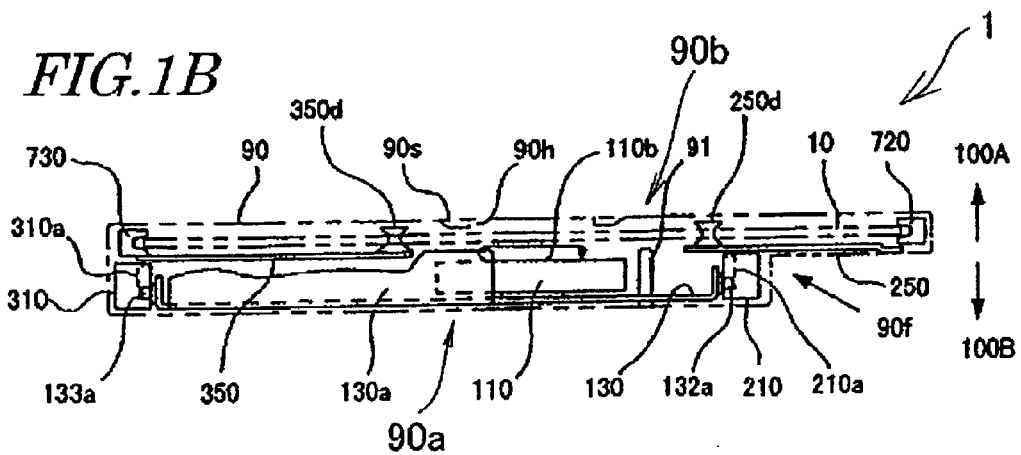
FIG. 1B is a front view of the disk drive shown in FIG. 1A.

Hereinafter, a disk drive according to a first specific preferred embodiment of the present invention will be described with reference to the accompanying drawings. First, an overall arrangement for the disk drive will be described with reference to FIGS. 1A and 1B. FIG. 1A is a plan view of the disk drive 1 of the first preferred embodiment as viewed vertically to the direction in which a disk 10 is transported. FIG. 1B is a front view of the disk drive 1 shown in FIG. 1A as viewed in the direction 10A. That is to say, the disk drive 1 shown in FIG. 1B is viewed in the disk loading direction. It should be noted that a direction indicated by an arrow will be herein simply referred to as a "direction" and identified by the reference numeral attached to the arrow, e.g., the direction indicated by the arrow 10A will be herein simply referred to as "the direction 10A".

The disk drive 1 of this preferred embodiment includes outer casing 90, base 100, first and second rockers 250 and 350 and first and second sliders 210 and 310.

The outer casing 90 forms the outer shape of the disk drive 1 and has a quasi-hexahedron shape with notches 90f and 90t. The outer casing 90 has first and second spaces 90a and 90b. The base 100 is stored in the first space 90a. The second space 90b is located over the first space 90a and stores the disk 10 as a storage medium in a freely rotatable state. As shown in FIG. 1B, the notch 90f is located under the second space 90b and adjacent to the first space 90a.

The base 100 includes a spindle motor 110 having a hub 110a and a turntable 110b. It should be noted that the "turntable" 110b is herein supposed to form a plane on which the disk 10 is mounted and is not limited to any particular shape. Thus, when some member is "located under the turntable", the member is herein supposed to be located under the plane on which the disk is mounted (i.e., the upper surface of the turntable), not the turntable itself. The spindle motor 110 is of a self-locking type. Specifically, when the disk 10 has its center hole 10a engaged with the hub 110a and is pressed against the turntable 110b, the spindle motor 110 can hold the disk 10 thereon with three holding claws 110c. The base 100 further includes: an optical head 120 for reading or writing information (signals) from/onto the disk 10; and supporting shafts 121 and 122 for supporting the optical head 120 in such a manner that the optical head 120 can be moved in the radial direction of the disk 10 by some actuating means (not shown).

These members 110, 120, 121 and 122 of the base 100 are disposed inside a base chassis 130. The base chassis 130 includes a partition 130a near the disk inserting slot (i.e., near the front side of the disk drive 1). When the disk 10 is mounted on the turntable 110b, the partition 130a, located outside of the disk 10, is almost as high as the upper surface of the hub 110a of the spindle motor 110.

The first and second sliders 210 and 310 are disposed adjacent to the side faces of the base 100 so as to interpose the base 100 between them. As shown in FIG. 1B, the first slider 210 is located on the right-hand side of the base 100 and is movable back and forth along the length of the disk drive 1 (i.e., in the disk transporting direction 10A or 10B). A pair of cam grooves 210a and 210b is formed through the side face of the first slider 210 that is opposed to the base 100 (see also FIGS. 5A through 5C). These cam grooves 210a and 210b respectively support pins 132a and 132b secured to the side face of the base chassis 130. As shown in FIG. 1B, the second slider 310 is located on the left-hand side of the base 100 and is movable back and forth in the disk transporting direction 10A or 10B. A pair of cam grooves 310a and 310b is formed through the side face of the second slider 310 that is opposed to the base 100. These cam grooves 310a and 310b respectively support pins 133a and 133b secured to the side face of the base chassis 130. The base 100 is regulated by a guide (not shown) in such a manner as to be raised and lowered vertically to the disk plane (i.e., in the direction 100A or 100B).

Figure 5A:
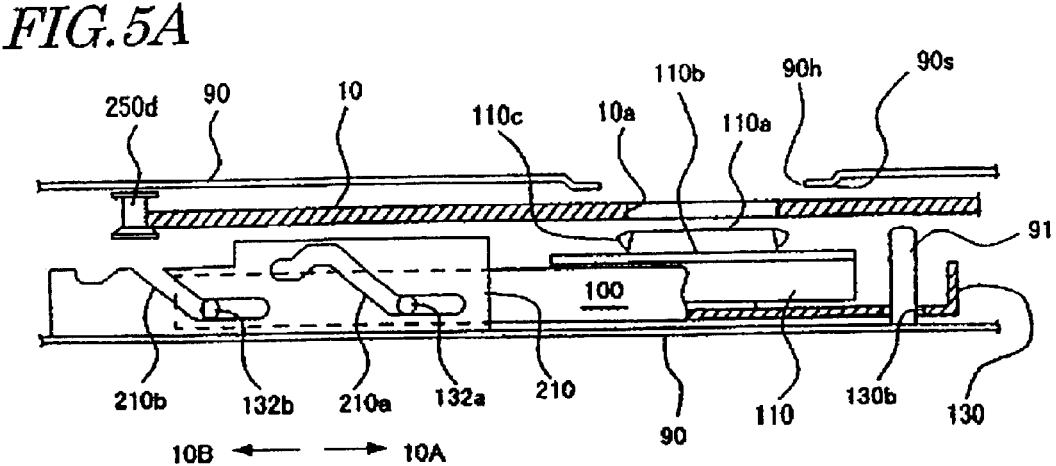
FIGS. 5A, 5B and 5C are partial cross-sectional views illustrating how the disk drive shown in FIGS. 1A and 11B raises and lowers the base.
Figure 5B:
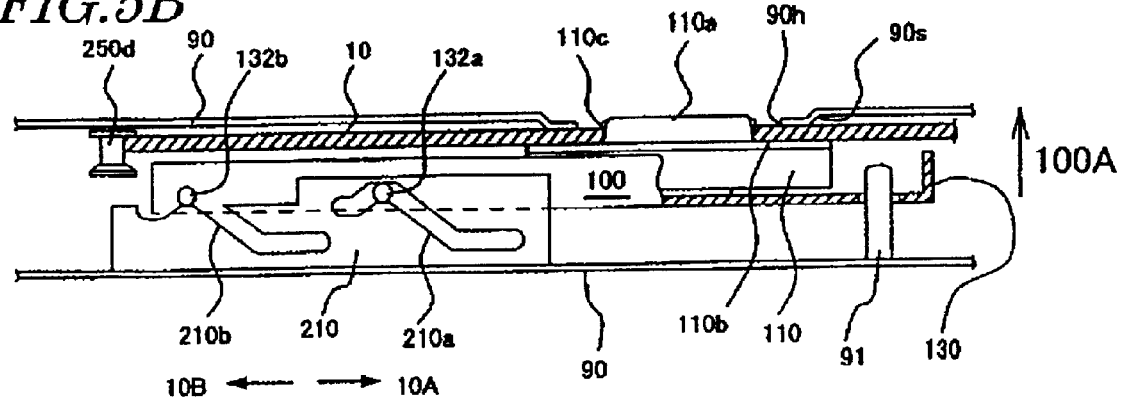

On the ceiling of the outer casing 90, a convex portion 90s, protruding inward, is provided at a position corresponding to the turntable 110b of the spindle motor 110. The convex portion 90s forms a hole 90h, into which the top of the hub 110a of the spindle motor 110 is inserted when the base 100 is raised. On the bottom of the outer casing 90, a pin 91 is provided near the spindle motor 110 so as to protrude inward. When the disk 100 is mounted on the turntable 110b, the pin 91 is located under the innerperiphery non-recording area (i.e., the lead-out area) of the disk 10. The pin 91 is secured to the outer casing 90 so as to extend through a hole 130b of the base chassis 130 (see FIG. 5A). Accordingly, even when the base 100 is raised or lowered as will be described later, the pin 91 is kept fixed. Thus, when the base 100 is in the lowest position, the top of the pin 91 is higher than the turntable 110b as shown in FIG. 5A. On the other hand, when the base 100 is in the highest position so that the turntable 110b mounts the disk 10 thereon, the top of the pin 91 is lower than the turntable 110b as shown in FIG. 5B.

The disk drive 1 includes a driver 281 such as a motor for driving the first slider 210. A worm gear 281a is fitted with the driver 281 and is interlocked with a rack 210g of the first slider 210 by way of an intermediate gear 282 and a pinion gear 283. By rotating the driver 281 bidirectionally, the first slider 210 can be transported in the direction 10A or 10B. The driver 281 may be either a motor of any of various types or a piezoelectric actuator that performs a linear operation.

Figure 5C:
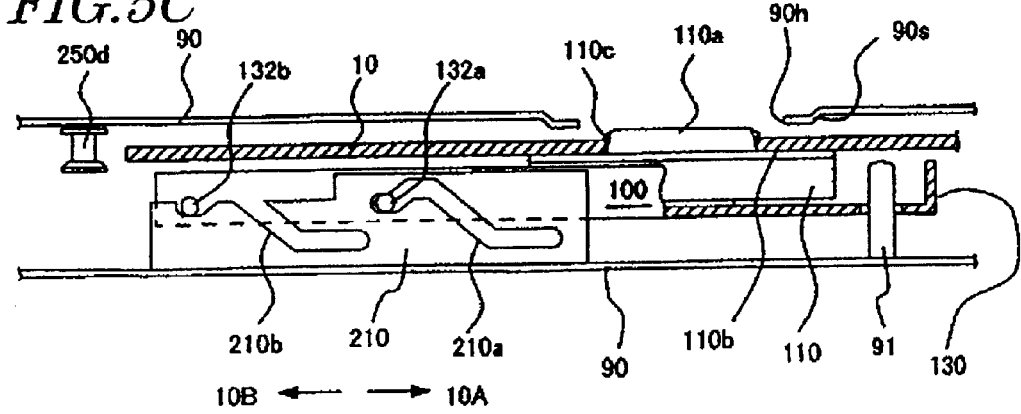

The driver 281 and the pinion gear 283 are supported by a driver support 285, which is secured to the outer casing 90. The driver support 285 includes an elongated protruding leaf spring 285a, which is located over the base chassis 130. When the base chassis 130 is raised to a level at which information is read or written from/on the disk 10, the leaf spring 285a comes into contact with the base chassis 130 and pushes it down. In this manner, the bottom of the pin 132b is pressed against the bottom of the cam groove 210b as shown in FIG. 5C.

The disk drive 1 further includes a slider coupling 410. The slider coupling 410 is secured to the outer casing 90 so as to turn around a fulcrum 410a behind the base 100. That is to say, the slider coupling 410 is opposed to the disk inserting slot. The slider coupling 410 is provided with fixing pins 412c and 413c at both ends thereof. These fixing pins 412a and 413c are engaged with holes 210c and 310c that are provided at the rear ends of the first and second sliders 210 and 310, respectively. When the first slider 210 is slid by the driver 281 in the direction 10A, the second slider 310 can be slid in the opposite direction 10B. Conversely, when the first slider 210 is slid in the direction 10B, the second slider 310 can be slid in the opposite direction 10A.

The first rocker 250 is secured to the outer casing 90 so as to turn around a fulcrum 250a over the first slider 210 parallelly to the disk plane. A force is applied by some elastic member (not shown) to the first rocker 250 in the direction 250A. The first rocker 250 includes: a pin 250s that extends downward to be engaged with the first slider 210; and a bent portion 250h engaged with a guide portion 90c of the outer casing 90. By engaging the bent portion 250h with the guide portion 90c of the outer casing 90, the first rocker 250 can rotate without being raised vertically to the disk plane.

The second rocker 350 also includes a pin 350s that extends downward to be engaged with the second slider 310. The second rocker 350 is secured to the outer casing 90 so as to turn around a fulcrum 350a near the second slider 310 parallelly to the disk plane. A force is applied by a torsion spring 356 to an application point 350b of the second rocker 350 in the direction 350A. The torsion spring 356 is a type of reversible spring and one end 356a thereof is secured to the outer casing 90. As will be described later, when the second rocker 350 is rotated by the disk 10 inserted to a certain degree in the direction 350B, the force applied from the torsion spring 356 to the point 350b reverses its direction with respect to the fulcrum 350a. As a result, the force starts to be applied to the second rocker 350 in the opposite direction 350B.

The disk drive 1 further includes a disk positioner 510. The disk positioner 510 includes pins 511a and 511b secured to the upper surface thereof. The disk positioner 510 is disposed at such a position that when the outer edge of the disk 10 comes into contact with the pins 511a and 511b, the center of the disk center hole 10a is aligned with that of the hub 110a of the spindle motor 110. Also, when the slider coupling 410 is rotated to a certain degree in the direction 410A, a bent portion 410a of the slider coupling 410 presses a pin 512 secured to the upper surface of the disk positioner 510, thereby moving the disk positioner 510 along with its pins 511a and 511b in the direction 10A.

Furthermore, a circuit board 810 is provided under the disk positioner 510 and the slider coupling 410 behind the base 100. A connector 811 and sensor switches 812 and 813, which are electrically connected to an external unit, have been mounted on the circuit board 810.

All of the above-described members but the pins 250d, 350d, 511a and 511b that guide the disk 10 when in contact with the outer edge of the disk 10, namely, the base 100 including the spindle motor 110 and optical head 120, the first and second sliders 210 and 310, the first and second rockers 250 and 350, the slider coupling 410, the disk positioner 510 and the circuit board 810, are located under the turntable 110b. That is to say, all of these members are go arranged so as to avoid contact with the disk 10 after the disk 10 starts to be inserted into this disk drive 1 from a position 10B and until the disk 10 is mounted on the turntable 110b at a position 10S.

The disk drive 1 further includes a switch lever 370 and guides 720 and 730. The switch lever 370 is secured to the outer casing 90 so as to turn around a fulcrum 370a over the slider 310. A force is applied by some elastic member (not shown) to the switch lever 370 in the direction 370B. When the second rocker 350 is rotated to a certain degree, one end 350e of the second rocker 350 presses one end 370e of the switch lever 370, thereby turning the switch lever 370 to the direction 370A. Then, a pin 370u provided at the other end of the switch lever 370 pushes the sensor switch 813. On the other hand, the guides 720 and 730 are provided along the front side faces of the outer casing 90 to hold and guide the disk 10 being inserted.

Figure 2A:
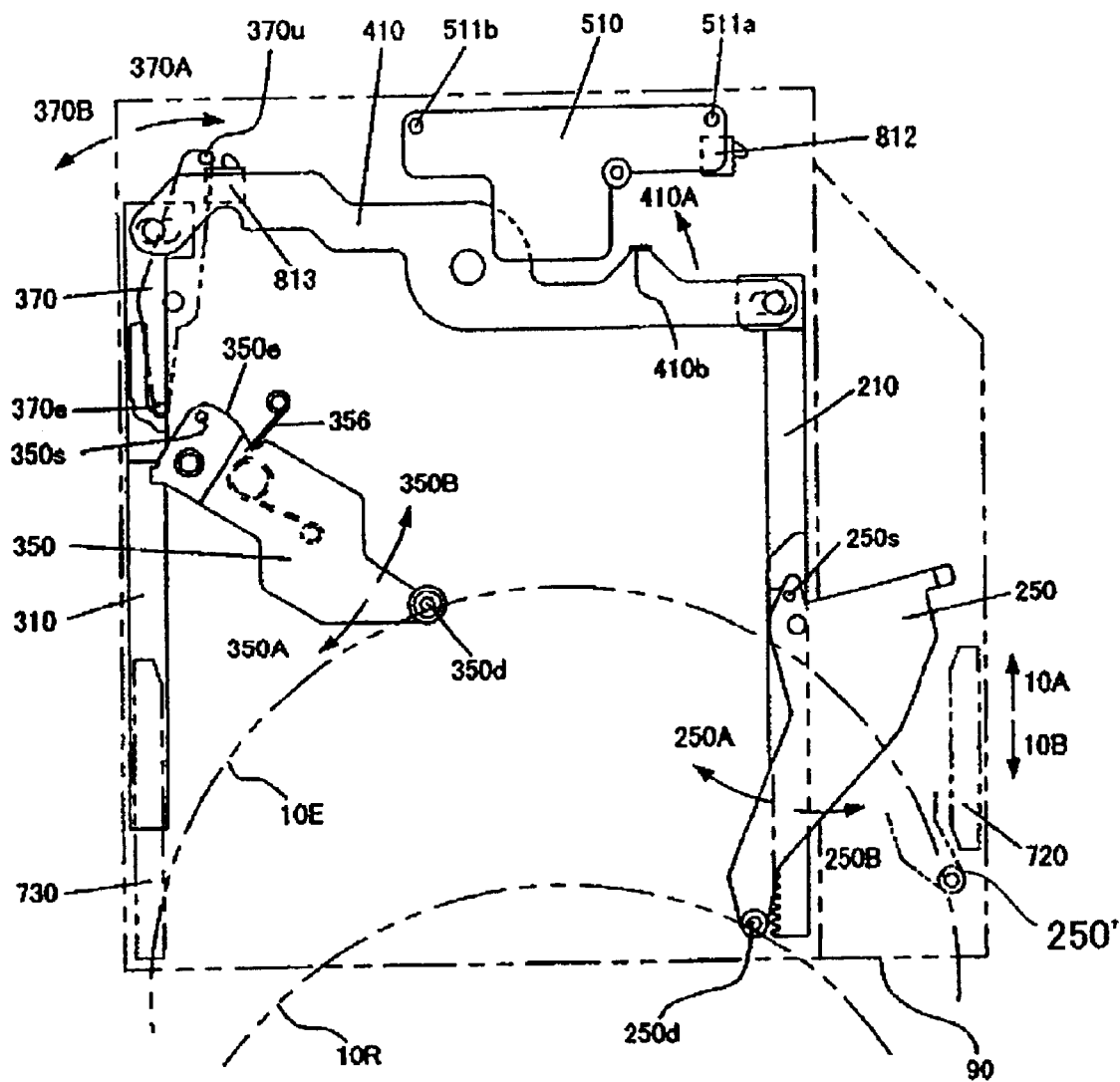
FIG. 2A is a plan view illustrating how the disk drive shown in FIGS. 1A and 1B transports the disk inserted.
Figure 2B:
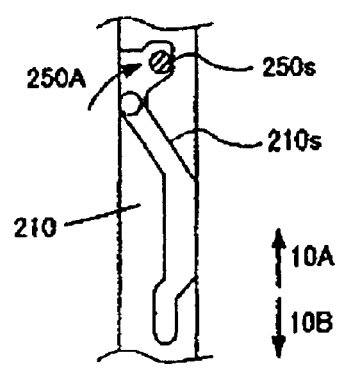
FIGS. 2B and 2C are plan views illustrating respective portions of the first and second sliders to a larger scale.
Figure 2C:
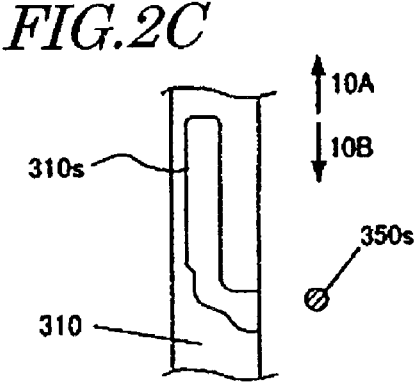

Hereinafter, it will be described with reference to FIGS. 2A through 7D how the disk drive 1 of the first preferred embodiment operates. First, it will be described how the disk drive 1 operates on the disk 10 being loaded. As shown in FIG. 2A, before the disk 10 is inserted into this disk drive 1, the first slider 210 is located in its frontmost position (i.e., closest to the disk inserting slot) while the second slider 310 is located in its rearmost position. As shown in FIG. 2B, the first rocker 250 is now stopped because the pin 250s, to which a force is being applied in the direction 250A, is in contact with a cam groove 210s in the upper surface of the first slider 210. As shown in FIG. 2A, the second rocker 350 is also stopped by a stopper (not shown) because a force is being applied thereto in the direction 350A. At this point in time, the pin 350s is off a cam groove 310s in the upper surface of the second slider 310 as shown in FIG. 2C. When the user inserts the disk 10 into this disk drive 1, the disk 10 reaches the position 10R where its outer edge comes into contact with the pin 250d provided at the front end of the first rocker 250.

Figure 3A:
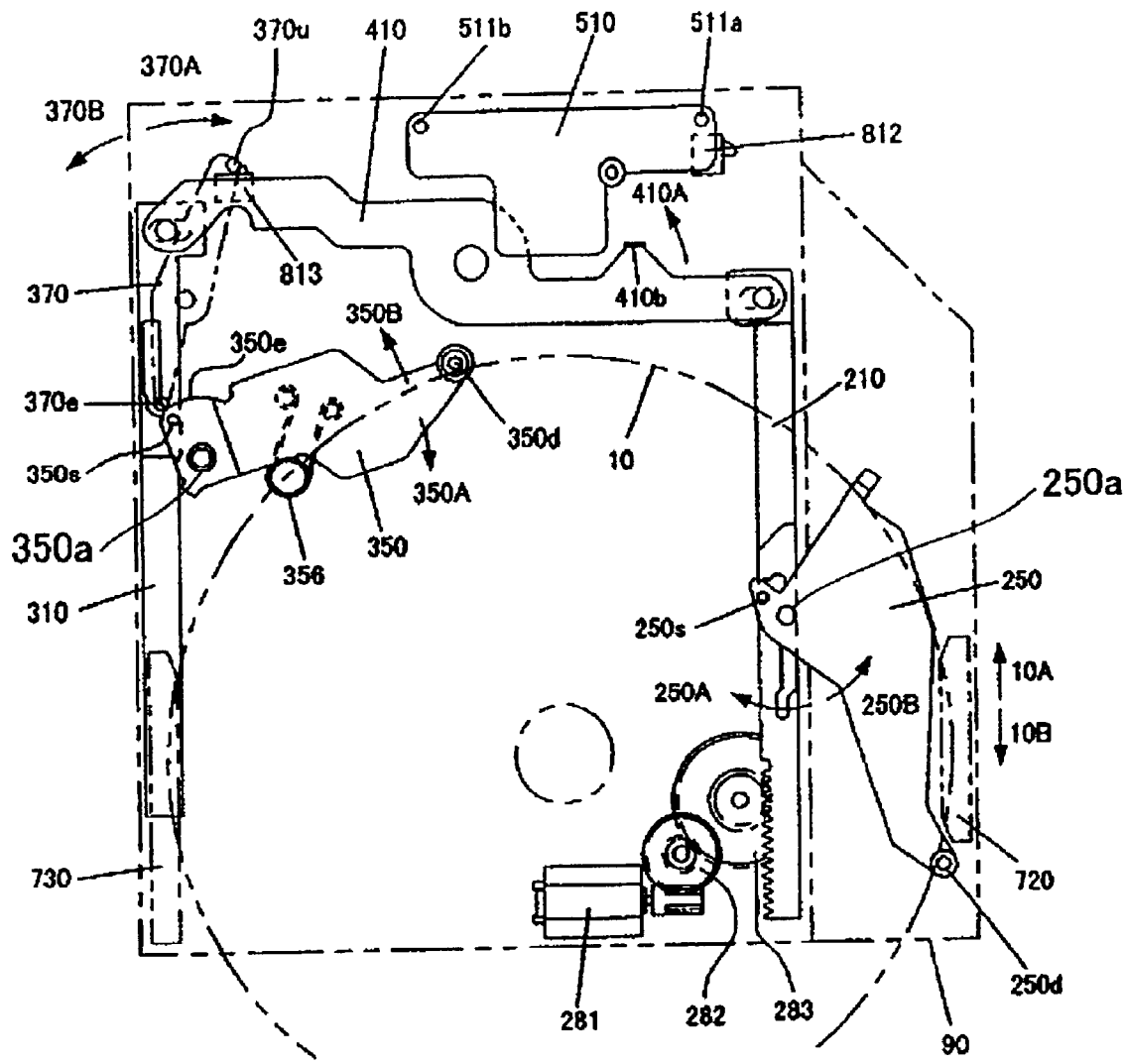
FIG. 3A is a plan view illustrating how the disk drive shown in FIGS. 1A and 1B transports the disk inserted.

Next, when the user further pushes the disk 10 deeper into this disk drive 1, the disk 10 reaches the position shown in FIG. 3A with its vertical and horizontal positions regulated by the pin 250d of the first rocker 250 and the right and left guides 720 and 730, respectively. During this movement, the disk 10 also comes into contact with the pin 350d of the second rocker 350. In this manner, the second rocker 350 regulates the vertical level of the upper surface of the disk 10.

As shown in FIGS. 2A and 3A, the disk 10 is inserted while the outer edge of the disk 10 is pressing the pin 250d of the first rocker 250. Accordingly, the first rocker 250 is rotated in the direction 250B as shown in FIG. 3A. In the meantime, the pin 250s of the first rocker 250 is moved inside the cam groove 210s to the position shown in FIG. 3B.

Figure 3C:
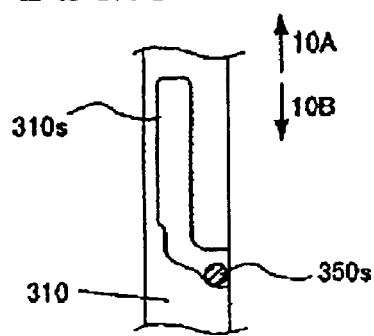
FIGS. 3B and 3C are plan views illustrating respective portions of the first and second sliders to a larger scale.

As the disk 10 presses the pin 350d, the second rocker 350 is also rotated to the direction 350B. As a result, the pin 350s is rotated to the vicinity of the side opening of the cam groove 310s as shown in FIG. 3C. Also, as shown in FIG. 3A, one end 350e of the second rocker 350 presses one end 370e of the switch lever 370, thereby turning the switch lever 370 to the direction 370A. Consequently, the pin 370u pushes the sensor switch 813. Up to this point in time, the first and second sliders 210 and 310 have substantially been kept unmoved.

Figure 4A:
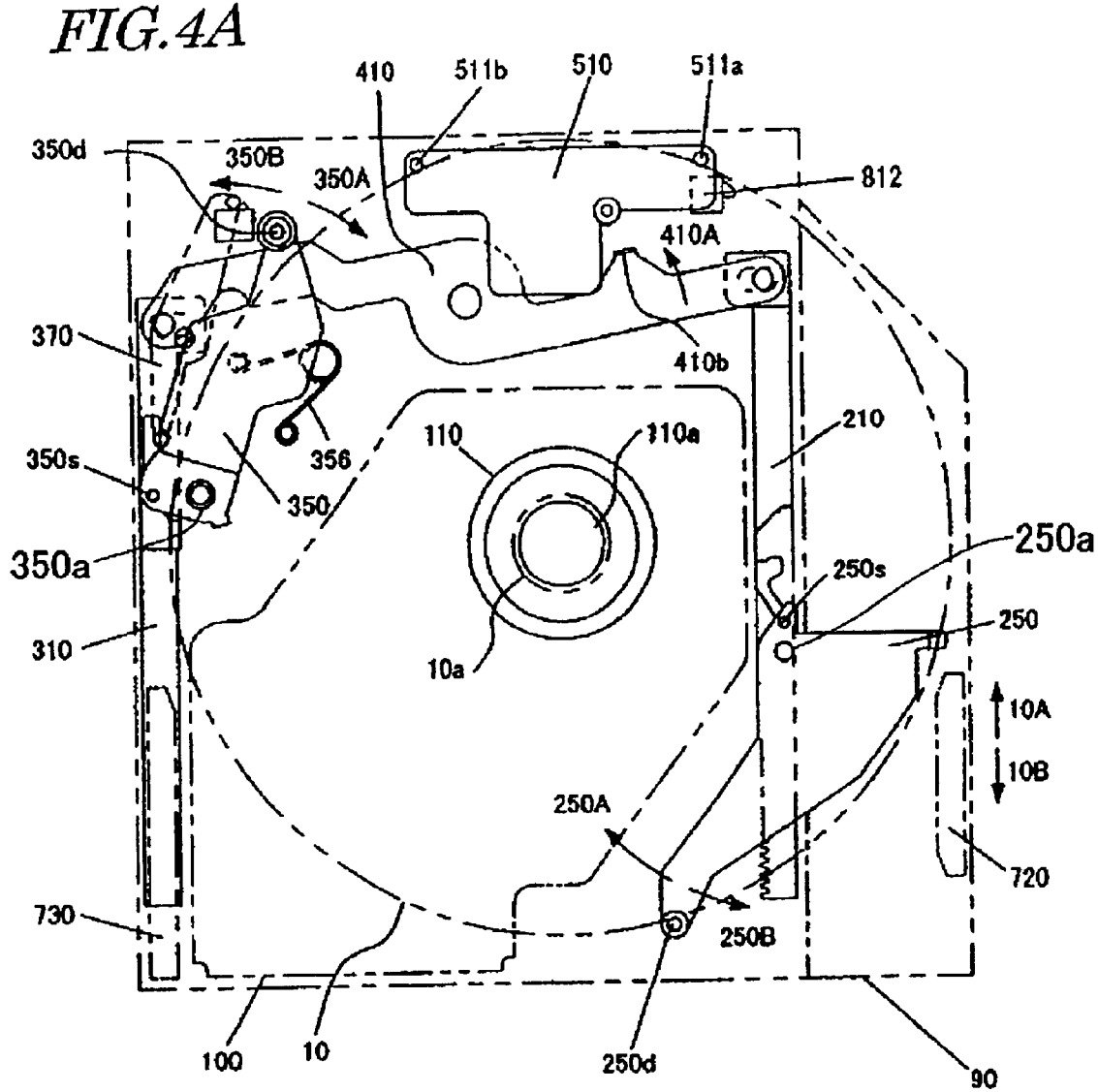
FIG. 4A is a plan view illustrating how the disk drive shown in FIGS. 1A and 1B transports the disk inserted.

As soon as the sensor switch 813 is pushed, the driver 281 starts to slide the first slider 210 in the direction 10A. At the same time, the second slider 310 also starts to slide in the direction 10B. Consequently, the respective parts of the disk drive 1 move to the positions shown in FIGS. 4A, 4B and 4C. Specifically, as shown in FIGS. 4A and 4B, the first slider 210 slides in the direction 10A. Thus, the cam groove 210s of the first slider 210 also moves in the same direction. As a result, the pin 250s of the first rocker 250 is relatively moved along the inner sidewall of the cam groove 210s of the first slider 210 to reach the position shown in FIG. 4B. Since the first rocker 250 is supported at the fulcrum 250a, the first rocker 250 is rotated to the direction 250A as shown in FIG. 4A as a result of the movement of the pin 250s. In this manner, the pin 250d of the first rocker 250 pulls in and transports the disk 10 until the disk 10 comes into contact with the pins 511a and 511b of the disk positioner 510.

Figure 4C:
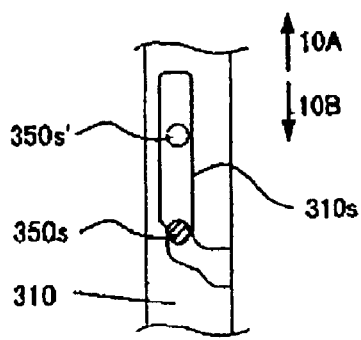
FIGS. 4B and 4C are plan views illustrating respective portions of the first and second sliders to a larger scale.
Figure 4B:
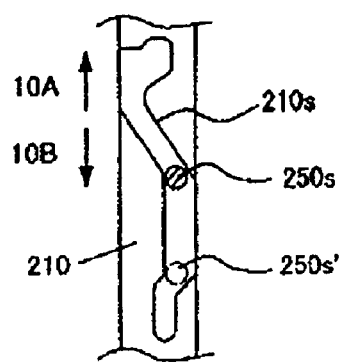

In the meantime, the second slider 310 slides in the direction 10B as shown in FIG. 4C. As a result, the pin 350s of the second rocker 350 is relatively moved along the inner sidewall of the cam groove 310s of the second slider 310 to reach the position shown in FIG. 4C. Since the second rocker 350 is supported at the fulcrum 350a, the second rocker 350 is rotated to the direction 350B as shown in FIG. 4A as a result of the movement of the pin 350s. At this time, the pin 350d of the second rocker 350 is moved in the direction 350B synchronously with the pin 250d at the end of the first rocker 250 while holding the disk 10 thereon. Once the disk 10 has come into contact with the pins 511a and 511b of the disk positioner 510, the pin 350d is rotated to a position slightly distant from the disk 10. In the state shown in FIG. 4A, the center hole 10a of the disk 10 is aligned with the center of the hub 110a of the spindle motor 110.

Figure 3B:
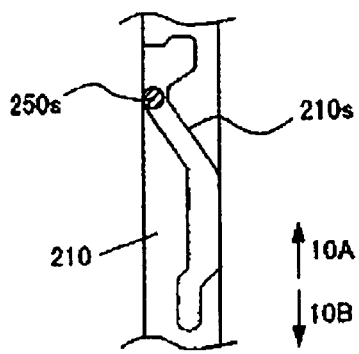

This operation of transporting the disk 10 from the position shown in FIGS. 3A, 3B and 3C to the position shown in FIGS. 4A, 4B and 4C will be herein referred to as a "disk pull-in operation". Also, the application force of the torsion spring 356 reverses its direction during this pull-in operation. Accordingly, although the second rocker 350 is rotated to a great degree to the direction 350B, a very small load is placed on the second slider 310. Furthermore, a force is also applied to the first rocker 250 in the direction 250A, and therefore, the load being placed on the first slider 210 is also very small. For these reasons, the load on the driver 281 during this pull-in operation is very small. Moreover, as shown in FIG. 4A, the first and second rockers 250 and 350 are outside of the projection area of the base 100, i.e., located neither over nor under the base 100. Accordingly, neither the first rocker 250 nor the second rocker 350 interferes with the subsequent upward movement of the base 100.

Next, it will be described how the spindle motor 110 mounts the disk 10 thereon as the base 100 is raised. As described above, the disk drive 1 pulls in the disk 10 until the center hole 10a of the disk 10 is aligned with the center of the hub 110a. Even after that, the first and second sliders 210 and 310 go on moving. As shown in FIGS. 4B and 4C, however, both of the pins 250s and 350s are now located in the straight portions of the cam grooves 210s and 310s, respectively. Accordingly, the first and second rockers 250 and 350 will temporarily stop rotating and remain at the positions shown in FIG. 4A until the pins 250s and 350s reach the positions 250s' and 350s' as a result of the further movement of the first and second sliders 210 and 310.

On the other hand, as shown in FIGS. 5A, 5B and 5C, as the first and second sliders 210 and 310 slide, the base 100 is raised, thereby mounting the disk 10 on the turntable 110b.

As shown in FIG. 5A, while the first slider 210 was sliding in the direction 10A, the pins 132a and 132b, provided for the side face of the base chassis 130 of the base 100, were moving horizontally along the straight portions of the cam grooves 210a and 210b in the side face of the first slider 210. Accordingly, even though the first slider 210 was horizontally sliding in the direction 10A, the base chassis 130 was still close to the bottom of the outer casing 90 without changing its vertical level.

However, as the pin 250s is moving toward the position 250s' as shown in FIG. 4B through the further horizontal movement of the first slider 210, the pins 132a and 132b are climbing the sloped portions of the cam grooves 210a and 210b on the side face of the first slider 210 as shown in FIGS. 5A and 5B. That is to say, as the first slider 210 slides horizontally, the pins 132a and 132b move upward along the cam grooves 210a and 210b while being pressed by the inner side faces of the cam grooves 210a and 210b. As a result, the base 100 is raised.

As shown in FIG. 1A, the side face of the second slider 310 is also provided with the cam grooves 310a and 310b, which are respectively engaged with the pins 133a and 133b of the base chassis 130. Accordingly, although not shown, the second slider 310 and the pins 133a and 133b also perform similar operations. Consequently, the pair of opposed side faces of the base 100 are raised substantially vertically to the bottom of the outer casing 90.

As shown in FIG. 5B, as the base 100 is raised, the hub 110a of the spindle motor 110 is gradually engaged with the center hole 10a of the disk 10. When the spindle motor 110 is further raised, the disk 10 is soon sandwiched between the convex portion 90s, provided on the ceiling of the outer casing 90, and the turntable 110b of the spindle motor 110. As a result, the claws 110c of the spindle motor 110 press the disk 110 against the turntable 110b. At this time, the upper part of the hub 110a of the spindle motor 110 enters the hole 90h formed by the convex portion 90s. In this manner, the disk 10 is mounted on the turntable 110b.

As shown in FIG. 5C, when the pins 132a and 132b reach the ends of the cam grooves 210a and 210b, respectively, the base 100, along with the disk 10 mounted on the spindle motor 110, is separated from the convex portion 90s and somewhat lowered. The base 100 is held at this vertical level, where the disk 10 is spun by the spindle motor 110 and the optical head 120 is operated to read or write information from/on the disk 10.

As described above, the second slider 310 also operates similarly to the first slider 210. Accordingly, the base 100 is raised and lowered while being horizontally supported at the four points, namely, the pins 132a, 132b, 133a and 133b.

The cam groove 210b is provided with only the bottom bearing as shown in FIG. 5B. Thus, if the base 100 has been deformed, the pin 132b, or the fourth fulcrum, might be disengaged from the cam groove 210b unintentionally. However, when the base 100 is lowered to the vertical level shown in FIG. 5C at which information is read or written from/on the disk 10, the elongated leaf spring 285a, protruding from the driver support 285, pushes the base chassis 130 down, thereby pressing the lower end of the pin 132b against the bottom of the cam groove 210b as shown in FIG. 1A. In this manner, the pin 132b is not raised unintentionally and the base 100 can keep its horizontal balance.

Figure 6A:
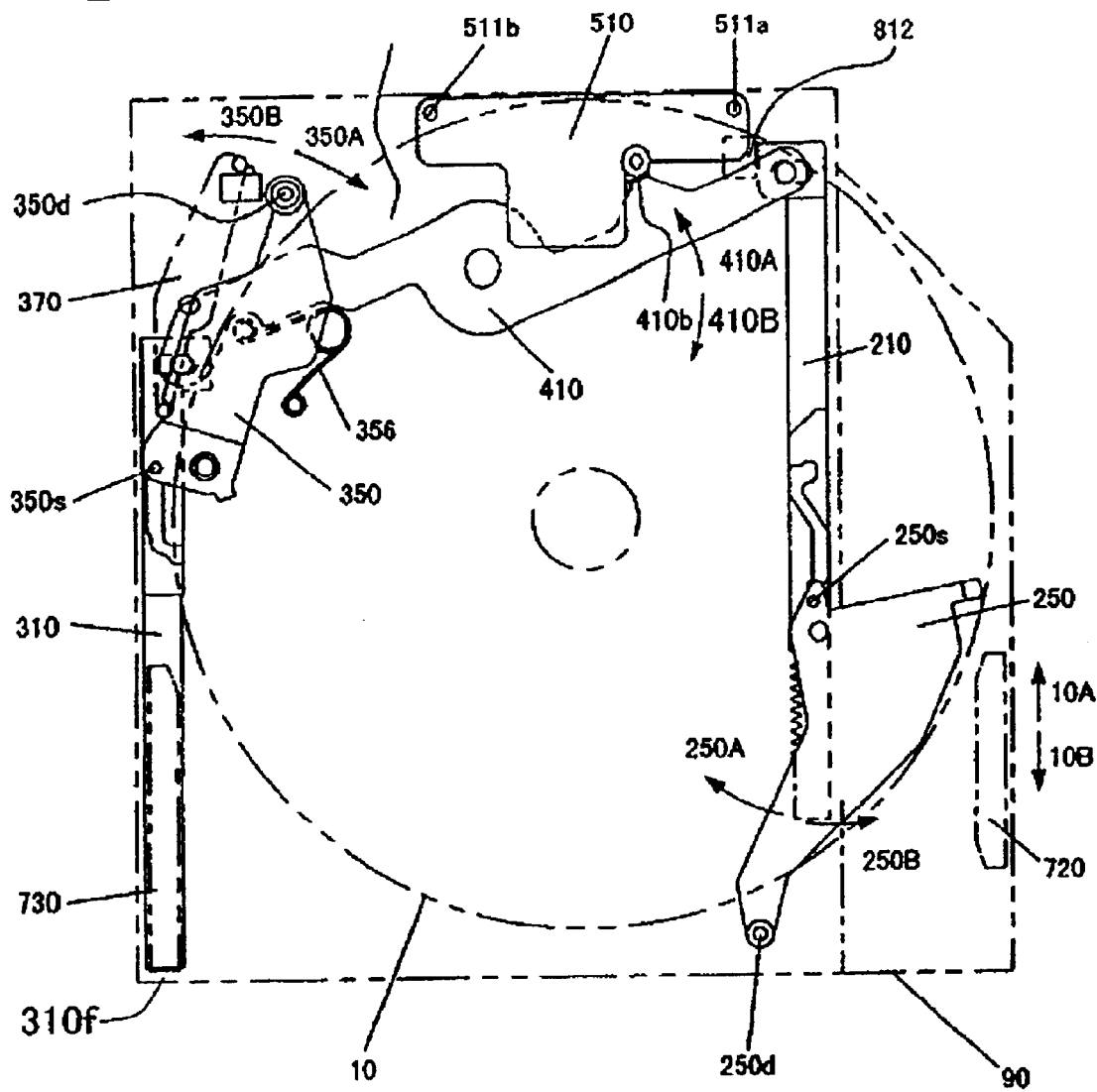
FIG. 6A is a plan view illustrating how the disk drive shown in FIGS. 1A and 1B transports the disk inserted.
Figure 6C:
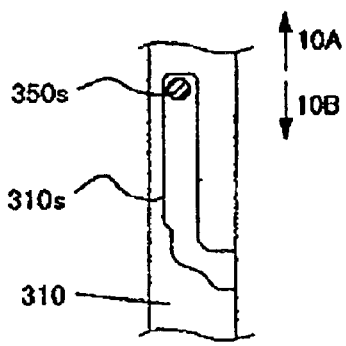
FIGS. 6B and 6C are plan views illustrating respective portions of the first and second sliders to a larger scale.
Figure 6B:
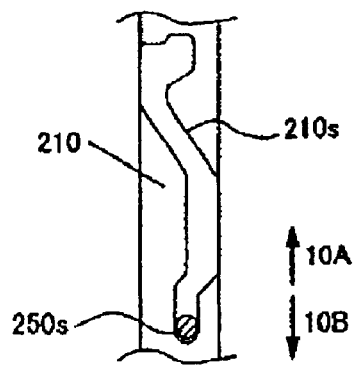

Also, while the first slider 210 is moving from the position shown in FIG. 5B to the position shown in FIG. 5C, the pin 250s of the first rocker 250 is slightly rotated by the cam groove 210s to the direction 250B as shown in FIG. 6A. As a result, the pin 250d of the first rocker 250 is separated from the disk 10. Also, the slider coupling 410 is rotated to the direction 410A. Thus, the bent portion 410b of the slider coupling 410 presses the disk positioner 510 in the direction 10A. Consequently, the pins 511a and 511b are slightly separated from the disk 10.

On the other hand, the pin 350d of the second rocker 350 has already been separated from the disk 10 in the state shown in FIGS. 4A, 4B and 4C. Accordingly, the second rocker 350 is not moved anymore in the state shown in FIG. 5C or 6A. This is because in the state shown in FIG. 5C or 6A, the second slider 310, which has been moving in the direction 10B, has reached its frontmost position inside the outer casing 90, while the first slider 210, which has been moving in the direction 10A, has reached its rearmost position inside the outer casing 90. And when the first slider 210 pushes the sensor switch 812, the driver 281 stops.

The "disk mounting operation" herein includes the steps of: getting the disk 10 engaged with the spindle motor 110 as the base 100 is raised from the position shown in FIG. 5A to the position shown in FIG. 5B; lowering the base 100 from the vertical level shown in FIG. 5B to that shown in FIG. 5C or 6A; separating the pins 250d, 511a and 511b, which have been transporting and positioning the disk 10, from the disk 10; and stopping the driver 281. It should be noted that when the base 100 is located at the vertical level shown in FIG. 5C, the partition 130a of the base chassis 130 closes up the disk inserting slot of the disk drive 1. Thus, no disk can be externally inserted by mistake while the spindle motor 110 is turning.

Next, it will be described how to dismount the disk 10 from the spindle motor 110 and eject the disk 10 from the disk drive 1. These operations are performed roughly in the order opposite to the disk loading operations.

Figure 7A:
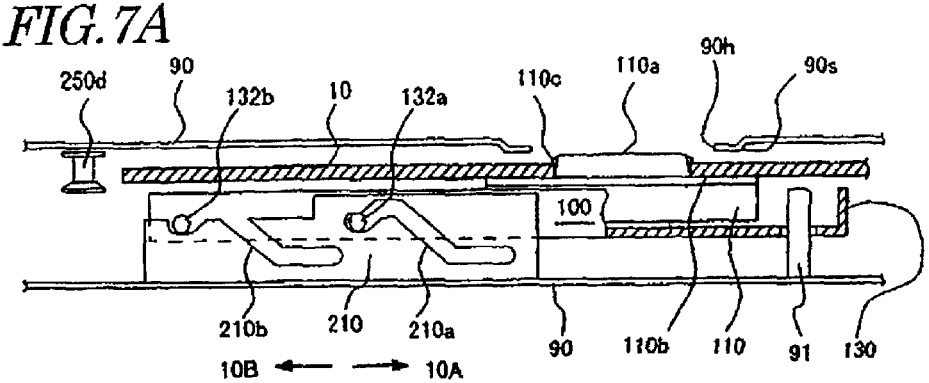
FIGS. 7A, 7B, 7C and 7D are partial cross-sectional views illustrating how the disk drive shown in FIGS. 1A and 1B raises and lowers the base.

In the state shown in FIGS. 6A and 7A, if the user gets an unload instruction sent by the computer through the connector 811 shown in FIG. 1A or depresses an unload switch (not shown) provided for the disk drive 1, then the driver 281 starts to slide the first and second sliders 210 and 310 in the directions 10B and 10A, respectively. That is to say, the first and second sliders 210 and 310 are moved in the directions opposite to the disk loading operations. As the first and second sliders 210 and 310 slide in these directions, the first rocker 250 once moves in the direction 250A. As a result, the pin 250d of the first rocker 250, which has been separated from the disk 10, comes into contact with the disk 10 again. At the same time, the slider coupling 410 is rotated to the direction 410B. Thus, the pins 511a and 511b of the disk positioner 510 also come into contact with the disk 10 again. Consequently, the disk drive 1 enters the state shown in FIG. 4A.

Figure 7B:
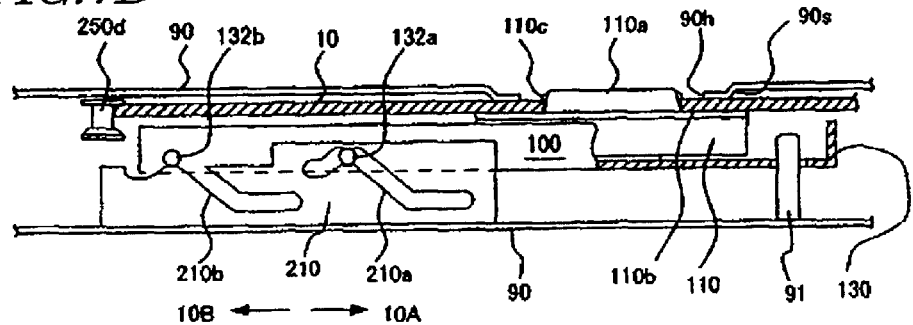

In the meantime, the first slider 210 slides in the direction 10B to reach the position shown in FIG. 7B while the cam groove 210a pushes the pin 132a and the base 100 up until the disk 10 comes into contact with the convex portion 90s on the ceiling of the outer casing 90 again.

Figure 7C:
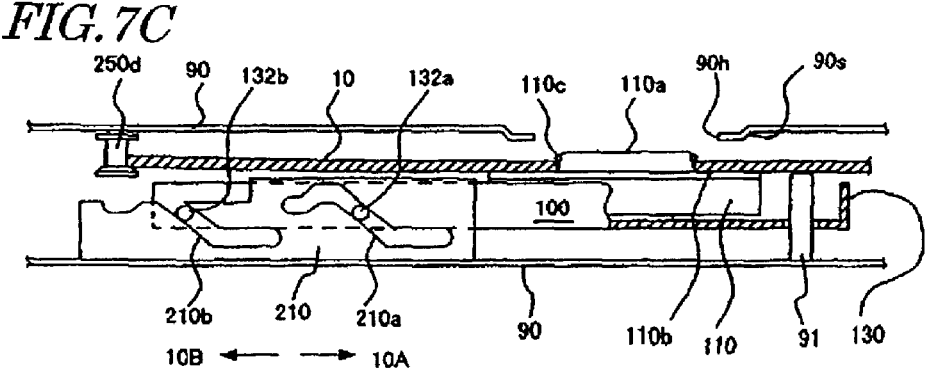
Figure 7D:
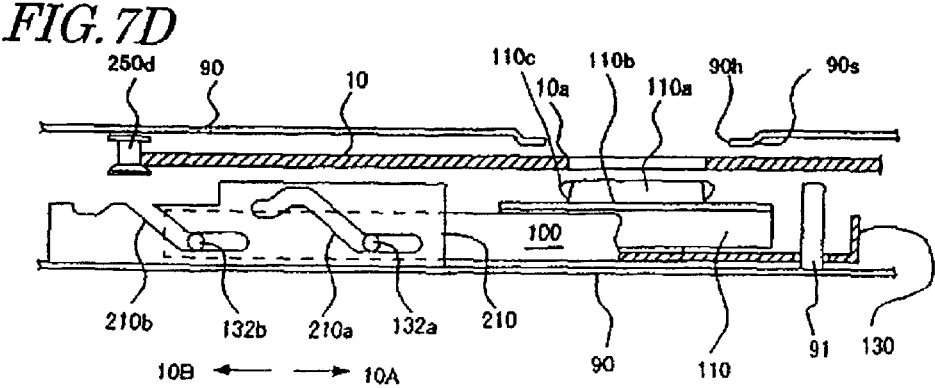

Thereafter, as the first and second sliders 210 and 310 further move, the pins 250s and 350s soon return to the positions 250s' and 350s' shown in FIGS. 4B and 4C, respectively. In the meantime, the first and second rockers 250 and 350 do not move but stop at the positions shown in FIG. 4A. On the other hand, as shown in FIGS. 7C and 7D, as the first slider 210 moves in the direction 10B, the pins 132a and 132b go down the sloped portions of the cam grooves 210a and 210b, respectively, while being pressed by the inner side faces of the cam grooves 210a and 210b. As a result, the base 100 is lowered to return to where the base 100 was located before the disk 10 was inserted. In this process, the base 100 tries to go down with the disk 10 held thereon. However, since the outer edge of the disk 10 is retained by the pins 250d and 350d, the disk 10 gets warped as shown in FIG. 7C. Nevertheless, the disk 10 is also pressed by the top of the pin 91, protruding upward from the bottom of the outer casing 90, near the spindle motor 110. Thus, the claws 110c provided for the hub 110a of the spindle motor 110 are depressed by the outer periphery of the center hole 10a of the disk 10, thereby disengaging the hub 110a from the center hole 10a of the disk 10. As a result, as shown in FIG. 7D, the disk 10 can be dismounted from the spindle motor 110. As used herein, the "disk dismounting operation" refers to these operations performed after the driver 281 started to operate and until the disk 10 is disengaged from the spindle motor 110.

Next, it will be described how to eject the disk 10 from this disk drive 1. As shown in FIGS. 3B and 3C, as the first and second sliders 210 and 310 slide in the directions 10B and 10A, respectively, the pin 350s of the second rocker 350 goes inside the cam groove 310s to reach the position shown in FIG. 3C. As a result, the second rocker 350 is rotated around the fulcrum 350a to the direction 350A. In this manner, the pin 350d of the second rocker 350 transports the disk 10 in the direction 10B.

In the meantime, as shown in FIG. 3B, the pin 250s of the first rocker 250 goes inside the cam groove 210s. Thus, the first rocker 250 is rotated around the fulcrum 250a to the direction 250B. In conjunction with the pin 350d of the second rocker 350, the pin 250d of the first rocker 250 is rotated to the direction 250B while holding the disk 10 thereon, thereby transporting the disk 10 in the direction 10B.

When the second rocker 350 being rotated to the direction 350A reaches the position shown in FIG. 3A, one end 350e of the second rocker 350 is separated from one end 370e of the switch lever 370. As a result, the switch lever 370 is turned to the direction 370B. Consequently, the sensor switch 813 is no longer depressed by the pin 370u of the switch lever 370. That is to say, the switch 813 is turned OFF.

Since the switch 813 has been turned OFF, the driver 281 stops, and the second slider 310, which has been moving in the direction 10A, reaches, and stops at, the rearmost position inside the outer casing 90. On the other hand, the first slider 210, which has been moving in the direction 10B, reaches, and stops at, the frontmost position inside the outer casing 90.

Also, during this ejecting operation, i.e., while the disk 10 is being transported from the position shown in FIGS. 4A through 4C to the position shown in FIGS. 3A through 3C, the application force of the torsion spring 356 reverses its direction. Accordingly, in the state shown in FIG. 3A, a force is applied to the second rocker 350 in the direction 350A. For that reason, even after the second slider 310 has stopped, the second rocker 350 dominates the force being applied to the first rocker 250 in the direction 250A, thereby transporting the disk 10 in the direction 10B. As a result, the second rocker 350 is rotated to reach the position 10E as shown in FIGS. 2A and 2C. At this time, the first rocker 250 is pushed by the second rocker 350 back to the position indicated by the broken line 250'. Consequently, the disk 10 is ejected to a position from which the user can easily remove the disk 10. This operation of the second rocker 350 that pushes the disk 10 back to the front side will be herein referred to as the "disk ejecting operation".

As has been described in detail, during the series of movements of the first and second sliders 210 and 310 being driven by the driver 281, the disk 10 is pulled in by the first rocker 250 and then mounted on the spindle motor 110 by the base 100 being raised. Also, during the series of reverse movements of the first and second sliders 210 and 310, the disk 10 is dismounted from the spindle motor 110 by the base 100 being lowered, and then ejected by the second rocker 350.

In case of emergency, the user may want to eject the disk 10 compulsorily. In that case, the intermediate gear 282 or other gear of the driver 282 may be disengaged by some disengaging member (not shown). Also, the front end 310f of the second slider 310, which has arrived at its frontmost position as shown in FIG. 6A, may be directly pressed externally, thereby moving the second and first sliders 310 and 210 in the directions 10A and 10B, respectively. In this manner, the disk 10 can also be ejected at any time the user wants.

The disk drive 1 of the first preferred embodiment described above needs no rollers as a means for transporting the disk 10. Accordingly, just a portion of the disk drive 1 that defines the space 90b in which the disk 10 is stored and rotated should be wider than the disk 10 itself, but the other portion 90a of the disk drive 1 may be narrower in width than the disk 10. Thus, the outer casing 90, including the notched portion 90f under the disk storage space 90b, may be used.

In addition, the disk 10 can be transported substantially by using the two rockers 250 and 350 only, and the rockers 250 and 350 themselves can be driven, and the base 100 including the spindle motor 110 can be raised and lowered, by the pair of sliders 210 and 310 alone. Thus, this disk drive may have a much simplified configuration and can be fabricated at a far lower cost.

Furthermore, almost all members are arranged under the turntable 110b and the disk 10 can be held without using any clamper. Accordingly, this disk drive 1 can have a reduced thickness.

Embodiment 2

Figure 8A:
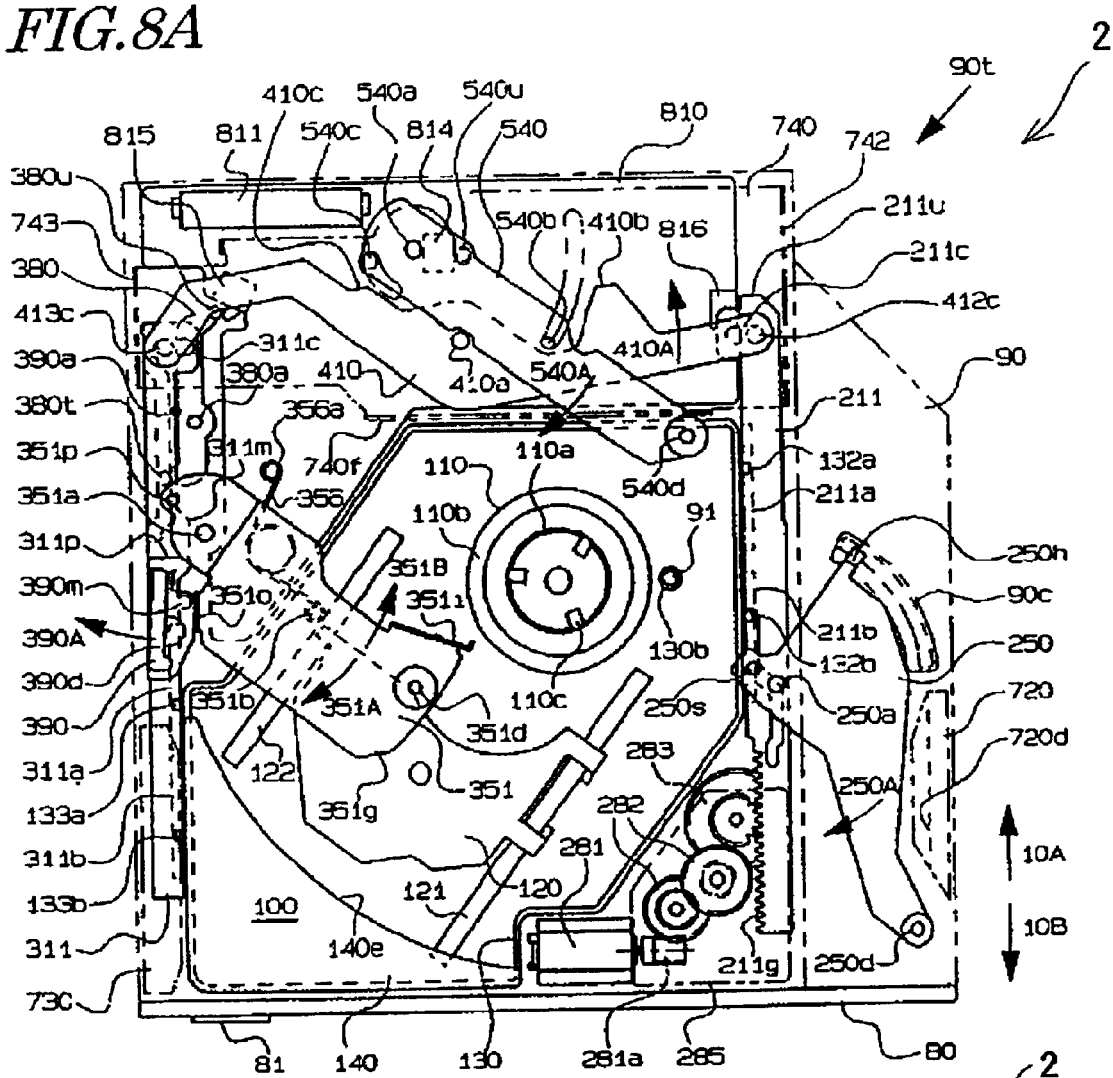
FIG. 8A is a plan view illustrating an overall arrangement for a disk drive according to a second specific preferred embodiment of the present invention.
Figure 8B:
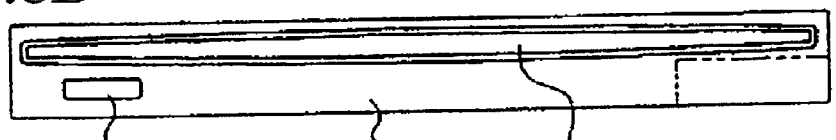
FIG. 8B is a front view of the disk drive shown in FIG. 8A.
Figure 8C:
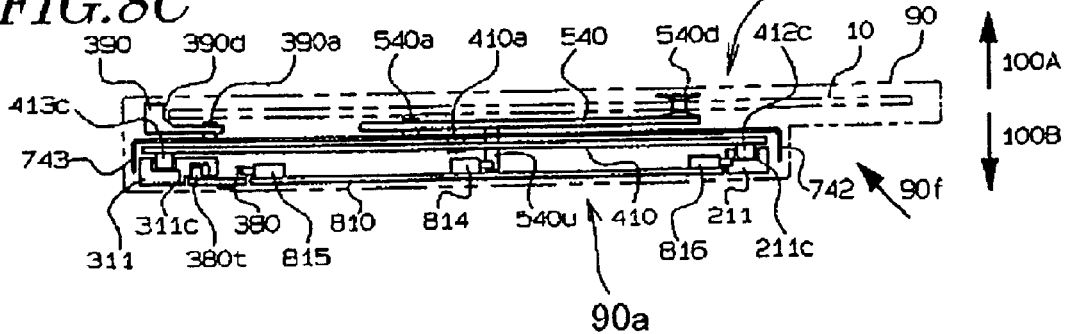
FIG. 8C is a partially cross-sectional front view of the disk drive shown in FIG. 8A as viewed with its front bezel removed from the disk drive.

Hereinafter, a disk drive according to a second specific preferred embodiment of the present invention will be described. First, an overall arrangement for the disk drive 2 will be described with reference to FIGS. 8A, 8B and 8C. FIG. 8A is a plan view of the disk drive 2 of the second preferred embodiment as viewed vertically to the direction in which the disk 10 is transported. FIG. 8B is a front view of the disk drive 2 shown in FIG. 8A as viewed in the direction 10A. FIG. 8C is a partially cross-sectional, front view illustrating the inside of the disk drive 2 shown in FIG. 8A as viewed in the direction 10A.

In FIGS. 8A, 8B and 8C, each member having substantially the same function as the counterpart of the first preferred embodiment is identified by the same reference numeral. Thus, the following description will mainly relate to the differences between the first and second preferred embodiments.

Like the disk drive 1 of the first preferred embodiment, the disk drive 2 of the second preferred embodiment also includes outer casing 90, base 100, first and second rockers 250 and 351 and first and second sliders 211 and 311.

The disk drive 2 further includes a front bezel 80, which is secured to the front of this disk drive 2 and includes a disk inserting slot 80w for inserting the disk 10 therethrough. Optionally, the disk inserting slot 80w may be provided with a cloth curtain to prevent dust from entering this disk drive 2. The disk 10 is inserted by the user in the direction 10A through this disk inserting slot 80w. The front bezel 80 further includes an unload switch 81 for use to unload the disk 10 from this disk drive 2.

The disk drive 2 further includes an insertion guide 140. The insertion guide 140 is placed on the base chassis 130 and includes a guide periphery 140e, which has an arched shape matching with the outer periphery of the disk 10 mounted on the turntable 110b of the spindle motor 110. The insertion guide 140 is provided to prevent the lower surface (i.e., the surface on which information is stored) of the disk 10 from coming into contact with the base 100 accidentally even if the disk 10 has been inserted through the disk inserting slot 80w at an inappropriate angle.

In this disk drive 2, the first and second sliders 211 and 311 are also disposed adjacently to the side faces of the base 100 so as to interpose the base 100 between them. As shown in FIG. 8A, the first slider 211 is located on the right-hand side of the base 100 and is movable back and forth along the length of the disk drive 1 (i.e., in the disk transporting direction 10A or 10B). A pair of cam grooves 211a and 211b is formed in the side face of the first slider 211 that is opposed to the base 100. These cam grooves 211a and 211b respectively support the pins 132a and 132b that are secured to the side face of the base chassis 130.

As also shown in FIG. 8A, the second slider 311 is located on the left-hand side of the base 100 and is movable back and forth in the disk transporting direction 10A or 10B. A pair of cam grooves 311a and 311b is formed in the side face of the second slider 311 that is opposed to the base 100. These cam grooves 311a and 311b respectively support the pins 133a and 133b secured to the side face of the base chassis 130. The base 100 is regulated by a guide (not shown) in such a manner as to be raised and lowered vertically to the disk plane (i.e., in the direction 100A or 100B). Also, the first slider 211 has an end 211u to depress an initial state detector 816 that has been mounted on the circuit board 810.

The outer casing 90 includes a supporting inner casing 740 that has two bent portions 742 and 743 at both ends of its longitudinal direction. As shown in FIG. 8A, the supporting inner casing 740 is elongated vertically to the directions 10A and 10B in which the first and second sliders 211 and 311 slide. The bent portions 742 and 743 are secured to the outer casing 90.

The slider coupling 410 is disposed under the supporting inner casing 740. The slider coupling 410 is secured at a fulcrum 410a to the supporting inner casing 740 so as to be rotatable within a predetermined plane that is vertically spaced apart from the circuit board 810 by a certain distance. The slider coupling 410 includes pins 412c and 413c at both ends thereof. These pins 412c and 413c are engaged with holes 211c and 311c that are provided at the rear ends of the first and second sliders 211 and 311, respectively. In this manner, the slider coupling 410 couples the first and second sliders 211 and 311 together. Accordingly, when the driver 281 running drives the first slider 211 in the direction 10A, the second slider 311 slides in the direction 10B. On the other hand, when the driver 281 reverses its rotational direction, the first and second sliders 211 and 311 start to slide in the directions 10B and 10A, respectively.

A disk guide 390, which is supported so as to turn around a fulcrum 390a, is also placed on the supporting inner casing 740. The disk guide 390 is disposed so as to face the first rocker 250 with the disk 10 interposed between them, and controls the disk transporting direction in conjunction with the first rocker 250. A force is applied from an elastic member (not shown) to the disk guide 390 in the direction 390A. Accordingly, a downwardly extending pin 390m of the disk guide 390 is always in contact with a guide surface 311m of the second slider 311. Thus, when the second slider 311 slides, the pin 390m also moves along the side face of the second slider 311. As a result, the disk guide 390 turns around the fulcrum 390a in accordance with the position of the pin 390m.

The second rocker 351 is secured to the outer casing 90 so as to turn around a fulcrum 351a parallelly to the disk plane. The fulcrum 351a is located near the second slider 311. If the torsion spring 356 applies a force to an application point 351b of the second rocker 351 in the direction 351A, then a bent portion 351o of the second rocker 351 comes into contact with, and stops at, the disk guide 390 as shown in FIG. 8A. However, when the second rocker 351 is rotated to a certain degree to the direction 351B, the force applied from the torsion spring 356 to the application point 351b reverses its direction with respect to the fulcrum 351a. Then, a force starts to be applied to the second rocker 351 in the opposite direction 351B. In that case, another bent portion 351i of the second rocker 351 comes into contact with, and stops at, a stopper 740i of the supporting inner casing 740 (see FIG. 11A). The second rocker 351 further includes a pin 351p, which extends downward and is pressed by a stepped portion 311p of the second slider 311.

As shown in FIG. 8A, the disk drive 2 of this second preferred embodiment includes a third rocker 540 instead of the disk positioner 510 of the first preferred embodiment. The third rocker 540 is also disposed over the supporting inner casing 740 so as to turn around a fulcrum 540a. A force is applied from an elastic member (not shown) to the third rocker 540 in the direction 540A. In other words, the force is applied to the third rocker 540 to rotate it to the direction 540A. Accordingly, a pin 540d, which is provided at one end of the third rocker 540, presses the disk 10 inserted against the pin 250d of the first rocker 250 and a disk guide plane 390d of the disk guide 390, thereby fixing the disk 10 at a predetermined position. The third rocker 540 also includes pins 540b and 540c, which extend downward and are pressed against respective ends 410b and 410c of the slider coupling 410. The third rocker 540 further includes a pin 540u, which presses a pull-in start sensor 814 that has been mounted on the circuit board 810.

A sensor lever 380 is disposed on the outer casing 90 so as to turn around a fulcrum 380a. A pin 380t protruding from the sensor lever 380 is engaged with the second slider 311 so that the sensor lever 380 turns as the second slider 311 slides. The sensor lever 380 has an end 380u to depress a mount completion sensor 815 that has been mounted on the circuit board 810.

Figure 9A:
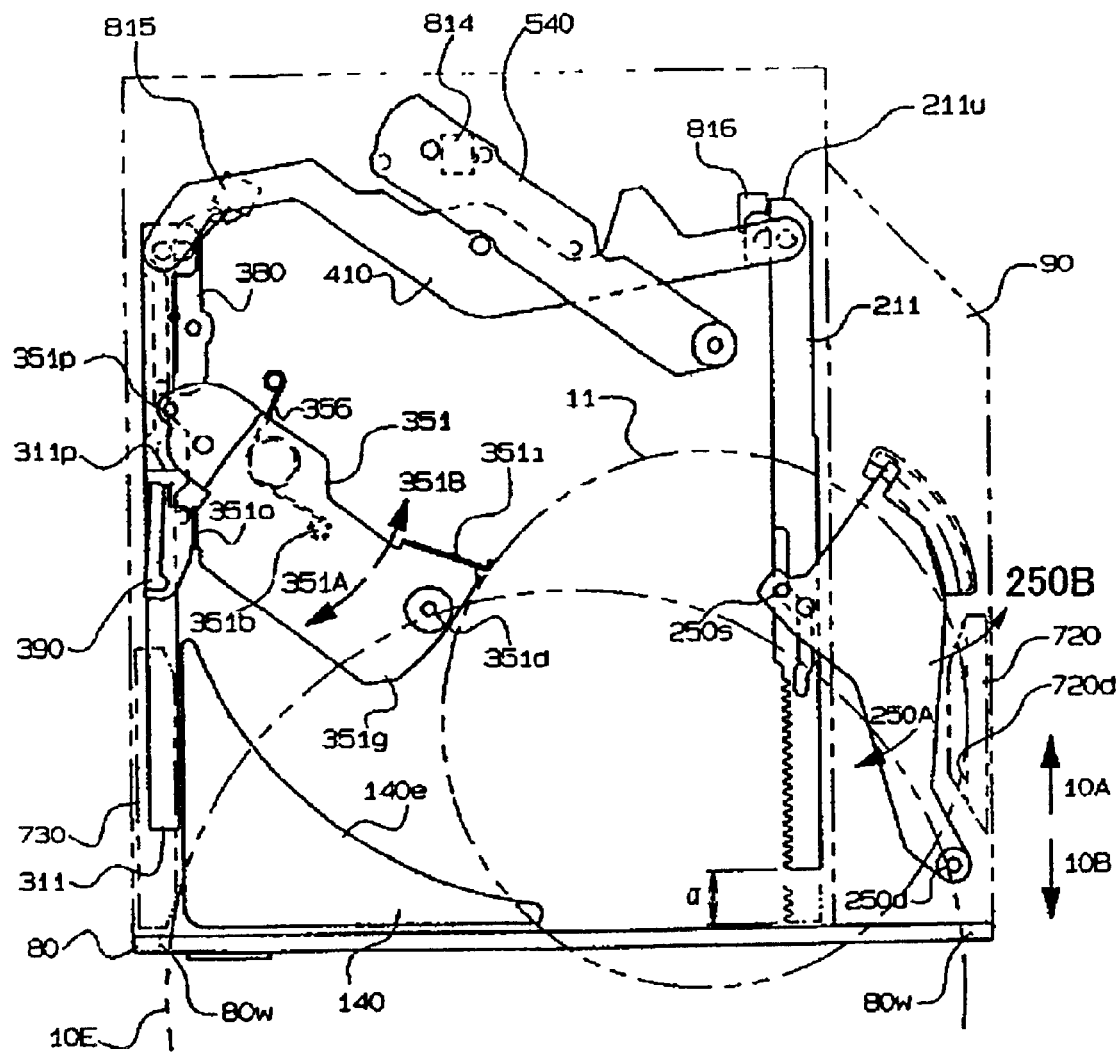
FIG. 9A is a plan view illustrating how the disk drive shown in FIGS. 8A through 8C transports the disk inserted.

Hereinafter, it will be described with reference to FIGS. 8A through 13D specifically how this disk drive 2 operates. First, the disk loading operation will be detailed. Before the disk 10 is inserted into this disk drive 2, the end 211u of the first slider 211 is located at such a position as to depress the initial state detector 816 as shown in FIG. 9A. A force is being applied from an elastic member (not shown) to the first rocker 250 in the direction 250A. As a result, the pin 250s of the first rocker 250 is in contact with, and stops at, the inner sidewall of a cam groove 211s of the first slider 211 as shown in FIG. 9B.

Figure 9D:
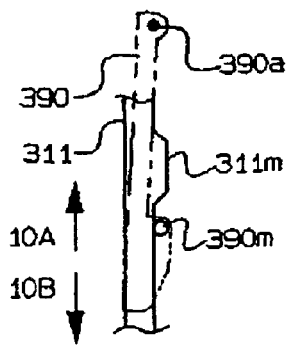
FIGS. 9C and 9D are plan views illustrating respective portions of the second slider to a larger scale.
Figure 9C:
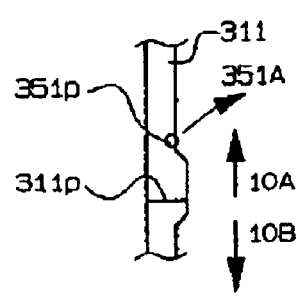
Figure 9B:
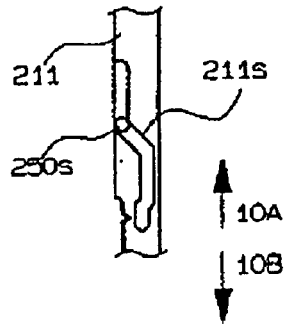
FIG. 9B is a plan view illustrating a portion of the first slider to a larger scale.

Also, as shown in FIGS. 9A and 9D, a force is being applied from the torsion spring 356 to the application point 351b of the second rocker 351 in the direction 351A. Thus, the bent portion 351o of the second rocker 351 is in contact with, and stops at, the disk guide 390. At this point in time, the pin 351p is off the stepped portion 311p of the second slider 311 as shown in FIG. 9C.

In such a state, the user inserts the disk 10 into this disk drive 2 in the direction 10A through the disk inserting slot 80w (see FIG. 8B). The disk 10 soon comes into contact with the pin 250d at the end of the first rocker 250 and with the pin 351d at the end of the second rocker 351 as indicated by the two-dot chain 10E in FIG. 9A. Until the disk 10 comes into contact with these pins 250d and 351d, the vertical level of the disk 10 is controlled by the insertion guide 140 and an expanded portion 351g of the second rocker 351. Thus, it is possible to prevent the disk 10 inserted from being tilted downward. As a result, the lower surface (i.e., the surface on which information is stored) of the disk 10 does not come into contact with, and get scratched by, any of the various members (e.g., the optical head 120) on the base 100. Also, the insertion guide 140 has the arched guide periphery 140e. Accordingly, the disk 10 and the guide periphery 140e are not in contact with each other but at their edges. For that reason, there is no concern about scratches on the lower surface of the disk 10.

Figure 10A:
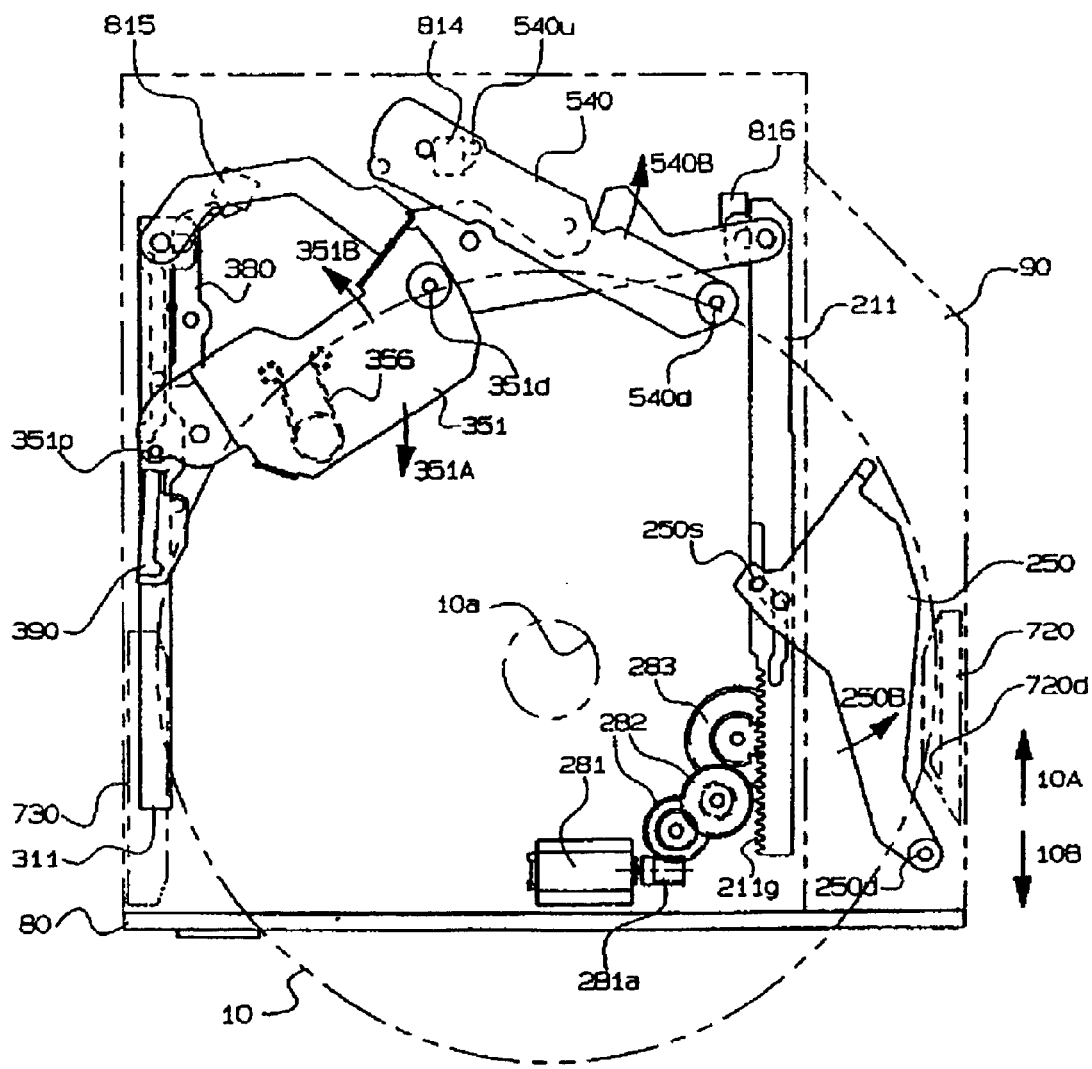
FIG. 10A is a plan view illustrating how the disk drive shown in FIGS. 8A through 8C transports the disk inserted.
Figure 10A:
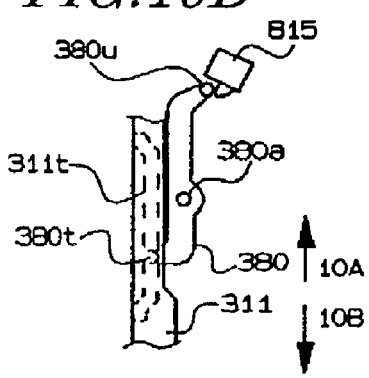
Figure 10A:
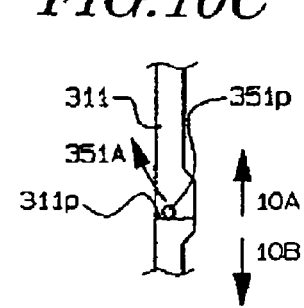
Figure 10A:
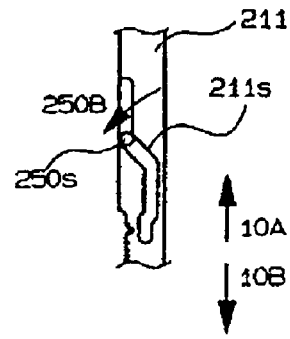
Figure 11A:
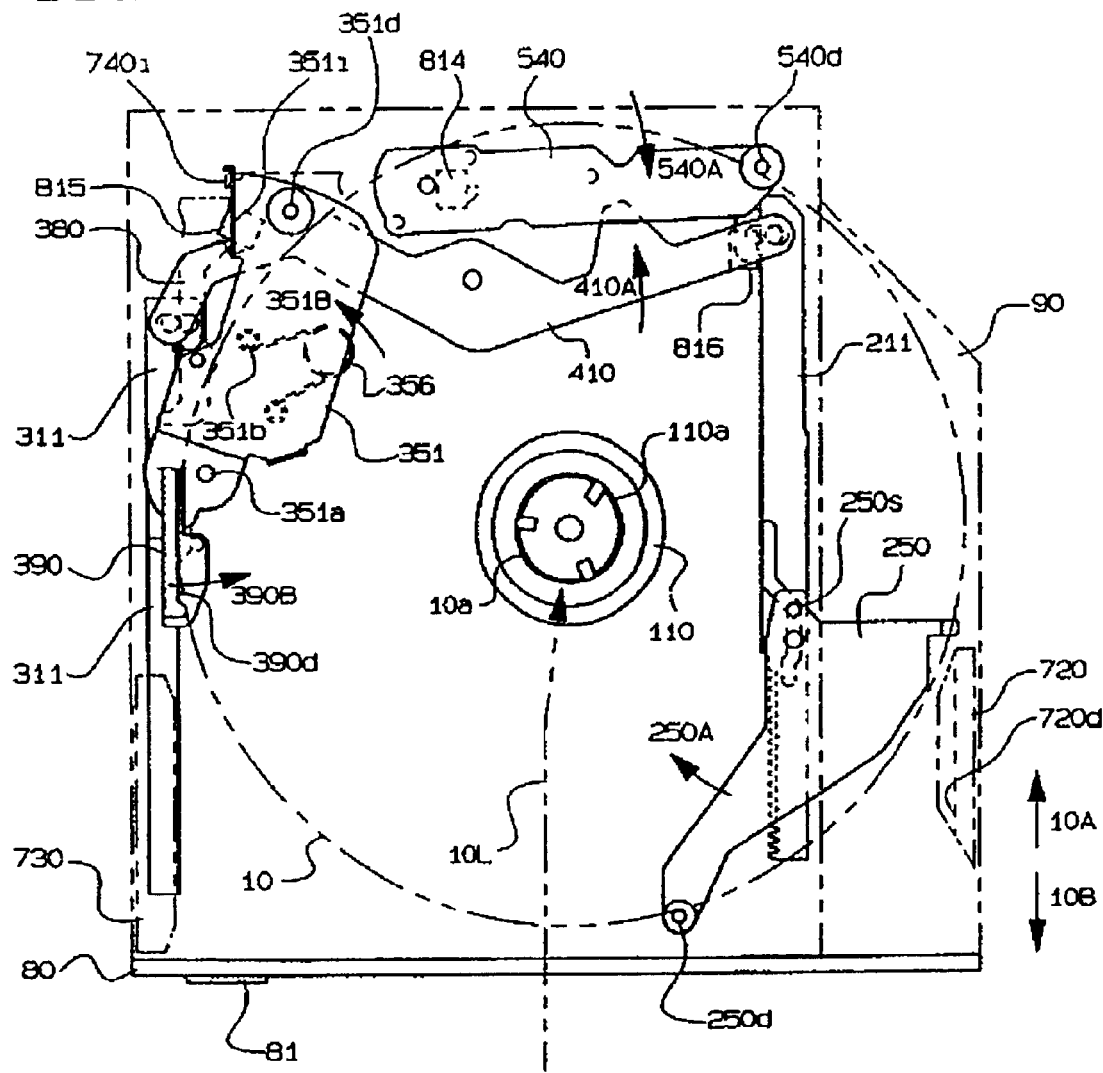
FIG. 11A is a plan view illustrating how the disk drive shown in FIGS. 8A through 8C transports the disk inserted.
Figure 11D:
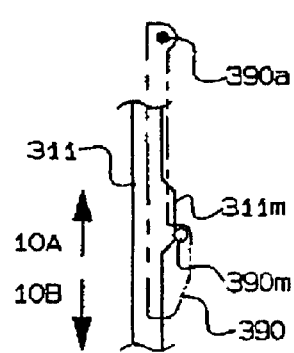
FIGS. 11C and 11D are plan views illustrating respective portions of the second slider to a larger scale.
Figure 11C:
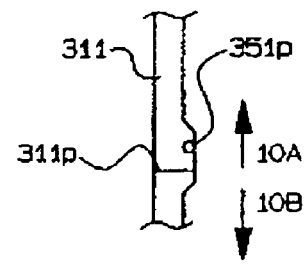
Figure 11B:
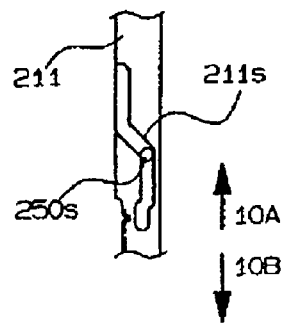
FIG. 11B is a plan view illustrating a portion of the first slider to a larger scale.

When the user inserts the disk 10 deeper into the disk drive 2 in the direction 10A, the disk 10 pushes the first rocker 250 away in the direction 250B and then rotates the second rocker 351 to the direction 351B while getting its horizontal position regulated by the right and left guides 720 and 730. In this manner, the disk 10 goes deep in the direction 10A. Then, the disk 10 soon presses the pin 540d, thereby rotating the third rocker 540 to the direction 540B as shown in FIG. 10A. As a result, the pull-in start sensor 814 is not depressed by the pin 540u anymore. In response, the driver 281 starts to slide the first slider 211 in the direction 10A. At the same time, the second slider 311 also starts to move in the direction 10B. When the first slider 211 moves in the direction 10A, the pin 250s of the first rocker 250 is driven by the inner sidewall of the cam groove 211s moving as shown in FIG. 11B. As a result, the first rocker 250 rotates to the direction 250A to reach the position shown in FIG. 11A. In this manner, the disk 10 is pulled in the disk drive 2. As used herein, the "disk pull-in operation" refers to the operation of transporting the disk 10 from the position shown in FIGS. 10A through 10D to the position shown in FIGS. 11A through 11D.

Until the driver 281 starts running, the disk guide 390 stands aside as shown in FIG. 9D. Then, the disk guide 390 starts to move during the pull-in operation. As shown in FIG. 11D, when the second slider 311 moves in the direction 10B, the pin 390m of the disk guide 390 is driven along the guide plane 311m of the second slider 311. As a result, the disk guide 390 is rotated in the direction 390B to reach the position shown in FIG. 11A and come into contact with the disk 10. In this manner, the disk 10 is pressed by the force being applied to the third rocker 540 in the direction 540A against the disk guide plane 390d of the disk guide 390 and the pin 250d of the first rocker 250 so as to be fixed at the predetermined position. At the same time, the disk 10 is also pulled in by the first rocker 250 to the position shown in FIG. 11A, i.e., to the position where the center hole 10a of the disk 10 is aligned with the center of the hub 110a of the spindle motor 110.

Also, during these operations, the force applied from the torsion spring 356 to the application point 351b of the second rocker 351, which has been pressed and rotated by the disk 10 to the direction 351B, reverses its direction with respect to the fulcrum 351a. As a result, the force starts to be applied to the second rocker 351 in the direction 351B and the bent portion 351i comes into contact with, and stops at, the stopper 740i of the supporting inner casing 740. At this point in time, the pin 351d of the second rocker 351 is off the outer periphery of the disk 10.

As described above, the disk guide 390 stands aside up to a certain point in time of the disk pull-in operation. Accordingly, when the disk 10 is inserted into the disk drive 2, the direction in which the disk 10 is going is initially regulated by the guide 720 on the right-hand side. Thus, the disk 10 being inserted goes slightly to the left with respect to the centerline. The disk 10 soon passes the guide 720 and then comes into contact with the pin 540d of the third rocker 540. Then, the driver 281 starts to run, thereby getting the disk 10 pulled in by the first rocker 250. At this point in time, the disk guide 390 also moves so as to regulate the direction in which the disk 10 inserted goes. As a result, the disk 10 being inserted is guided by the disk guide 390 in such a manner as to go slightly to the right this time. Thus, the center of the disk 10 follows the trace indicated by the arrow 10L in FIG. 11A during this pull-in operation.

In this manner, the disk drive 2 of this second preferred embodiment transports the disk 10 by making full use of its horizontal space. Thus, this disk drive 2 can have a reduced width. In addition, the force is applied to the third rocker 540 in the direction 540A. Accordingly, even if the disk drive 2 is mounted vertically so that the rear side of the disk drive 2 faces down (i.e., so that the disk 10 is transported downward in the direction 10A), the disk 10 still can be pressed against the disk guide plane 390d and the pin 250d of the first rocker 250 strongly enough to bear the weight of the disk 10.

Next, it will be described how the first and second sliders 211 and 311 raise and lower the base 100. The operations including raising the base 100, engaging the center hole 10a of the disk 10 with the hub 110a of the spindle motor 110 and mounting the disk 10 on the turntable 110b are performed just as already described for the first preferred embodiment with reference to FIGS. 5A, 5B and 5C. During these disk mounting operations of the spindle motor 110, the pin 250s of the first rocker 250 lies along the straight portion of the cam groove 211s as shown in FIG. 11B. Also, as shown in FIG. 11C, the pin 351p of the second rocker 351 is off the stepped portion 311p of the second slider 311. Since the disk 10 is unmoved, the third rocker 540 rests at the position shown in FIG. 11A.

Figure 12A:
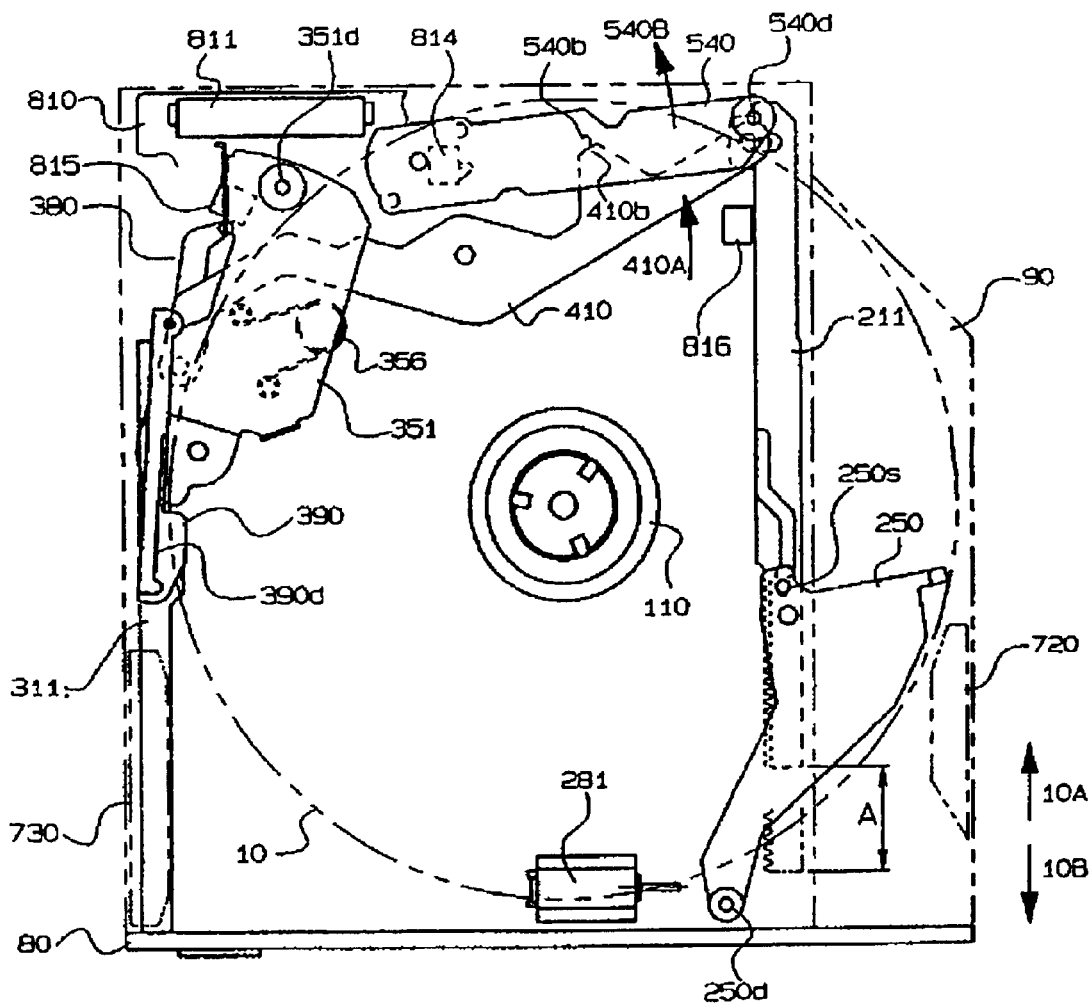
FIG. 12A is a plan view illustrating how the disk drive shown in FIGS. 8A through 8C transports the disk inserted.
Figure 12D:
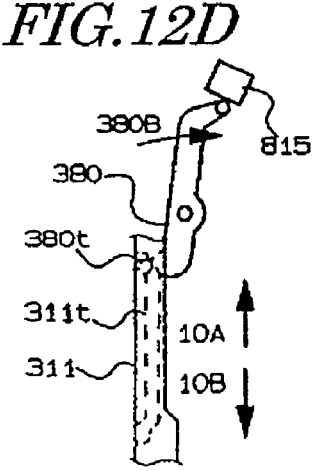
FIGS. 12C and 12D are plan views illustrating respective portions of the second slider to a larger scale.
Figure 12C:
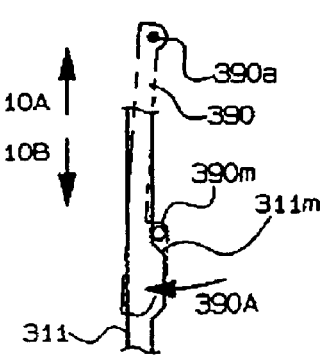
Figure 12B:
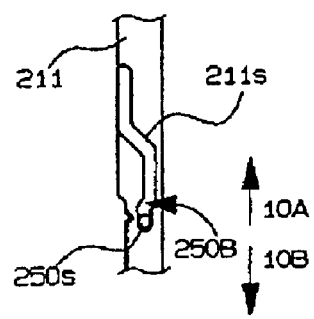
FIG. 12B is a plan view illustrating a portion of the first slider to a larger scale.

As in the first preferred embodiment, while the disk drive 2, which has entered the state shown in FIG. 5B, is going to enter the state shown in FIG. 5C, the pin 250s of the first rocker 250 is slightly rotated to the direction 250B as shown in FIG. 12B by the cam groove 211s moving in the direction 10A. As a result, the pin 250d of the first rocker 250 is separated from the outer periphery of the disk 10 as shown in FIG. 12A. Also, as shown in FIGS. 12A and 12C, the guide plane 311m of the second slider 311 moves in the direction 10B. Accordingly, the pin 390m of the disk guide 390 is moved along the guide plane 311m in the direction 10A. As a result, the disk guide plane 390d of the disk guide 390 is separated from the outer periphery of the disk 10. Furthermore, as the first slider 211 slides, the slider coupling 410 rotates to the direction 410A. Thus, the end 410b of the slider coupling 410 presses the pin 540b of the third rocker 540, thereby rotating the third rocker 540 to the direction 540B. Consequently, the pin 540d of the third rocker 540 is also separated from the outer periphery of the disk 10.

As shown in FIG. 12A, the first slider 211, which has gone the distance A from its home position shown in FIG. 9A in the direction 10A, has now reached its rearmost position in the outer casing 90. On the other hand, the second slider 311, which has been moving in the direction 10B, has now reached its frontmost position in the outer casing 90. As shown in FIG. 12D, the pin 380t of the sensor lever 380 has been guided by the cam groove 311t of the second slider 311 and has rotated the sensor lever 380 to the direction 380B, thereby depressing the mount completion sensor 815. As a result, the driver 281 stops and the first and second sliders 211 and 311 also stop.

As described above, the pins 250d and 540d of the first and third rockers 250 and 540 and the disk guide plane 390d of the disk guide 390, which were all in contact with the disk 10 while the disk 10 was being inserted, are now out of contact with the disk 10. Accordingly, the disk 10 is now ready to be rotated by the spindle motor 110. In such a state, the disk drive 2 gets the disk 10 rotated by the spindle motor 110 and makes the optical head 120 on the base 100 read or write information from/onto the disk 10.

Next, it will be described how to dismount the disk 10 from the spindle motor 110 and eject the disk 10 from the disk drive 2. In the state shown in FIGS. 12A, 12B, 12C and 12D, if a disk unload instruction is sent by the computer through the connector 811 or if the user directly depresses the unload switch 81 of the front bezel 80 (see FIG. 8B), then the driver 281 starts to slide the first and second sliders 211 and 311 in the directions 10B and 10A, respectively. That is to say, the first and second sliders 211 and 311 start to move in the directions opposite to those of the disk loading operations. Then, the pins 250d and 540d of the first and third rockers 250 and 540 and the disk guide plane 390d of the disk guide 390, which have all been out of contact with the disk 10, come into contact with the outer periphery of the disk 10 again and hold the disk 10 thereon as shown in FIG. 11A.

Subsequently, as the first and second sliders 211 and 311 move in the respective directions, the base 100 is once raised and then lowered, thereby dismounting the disk 10 from the turntable 110. These disk dismounting operations are the same as those of the first preferred embodiment that have already been described with reference to FIGS. 7A through 7D.

Next, it will be described how to eject the disk 10 that has been dismounted from the spindle motor 110. As shown in FIGS. 10A and 10C, the pin 351p of the second rocker 351 is pressed in the direction 10A by the stepped portion 311p of the second slider 311 moving in the direction 10A, thereby rotating the second rocker 351 to the direction 351A. In this manner, the pin 351d of the second rocker 351 pushes the disk 10 in the direction 10B. As a result, the disk 10 is transported in the ejecting direction with its horizontal position regulated by the guides 720 and 730. In the meantime, the pin 250s of the first rocker 250 is guided by the cam groove 211s moving in the direction 10B, thereby rotating the first rocker 250 to the direction 250B as shown in FIG. 10B. That is to say, the pin 250d is rotated so as to go away from the disk 10 being ejected, i.e., so as to be separating from the outer periphery of the disk 10. While the disk drive 2 is changing from the state shown in FIG. 12A into that shown in FIG. 10A, the force applied from the torsion spring 356 reverses its direction. As a result, in the state shown in FIG. 10A, the force is applied to the second rocker 351 in the direction 351A. In this manner, the disk 10 is transported by the second rocker 351.

Figure 13A:
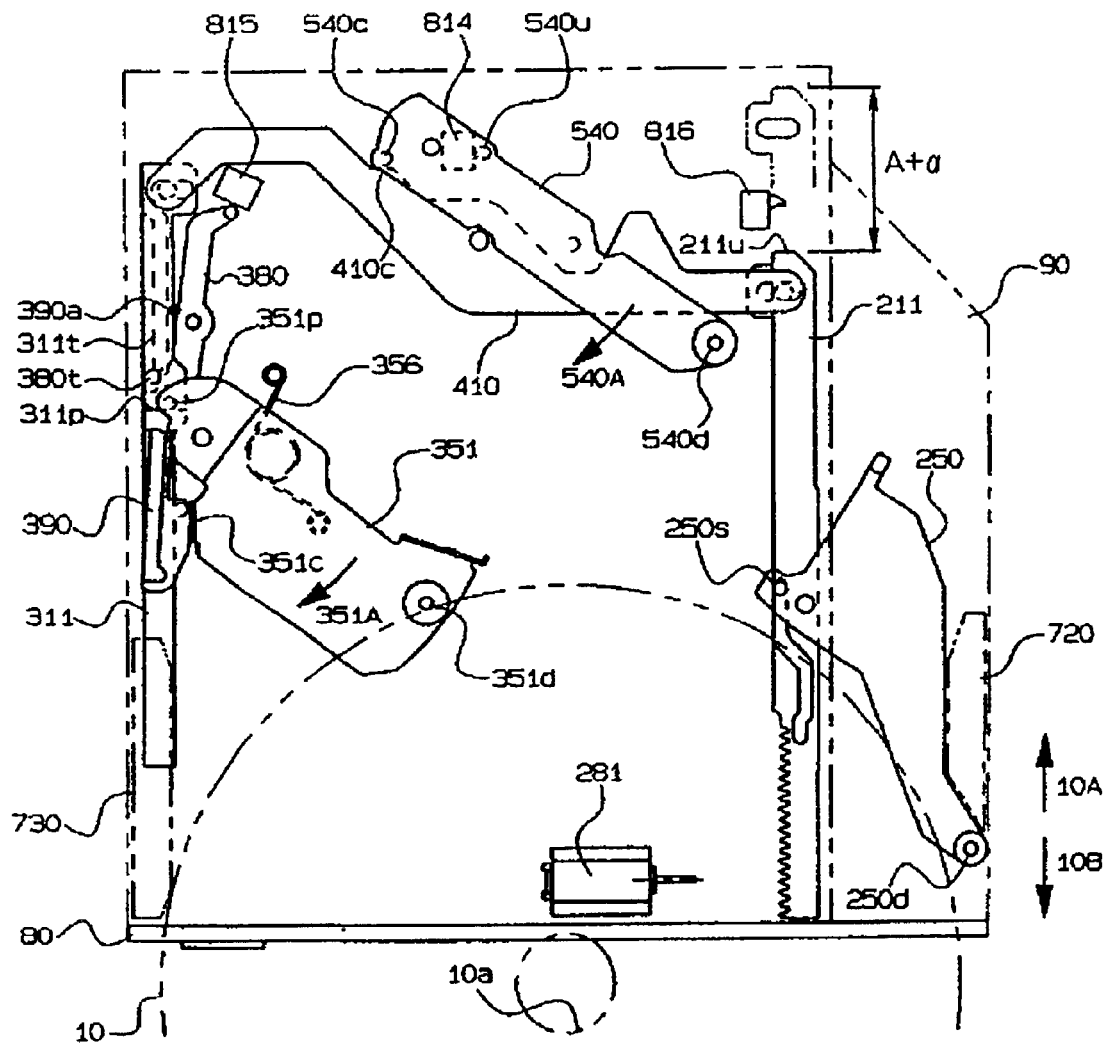
FIG. 13A is a plan view illustrating how the disk drive shown in FIGS. 8A through 8C transports the disk inserted.
Figure 13D:
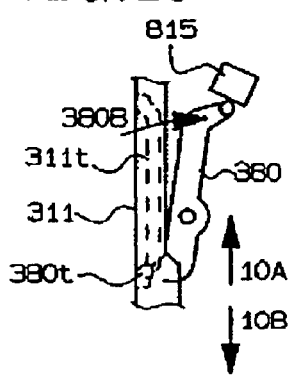
FIGS. 13C and 13D are plan views illustrating respective portions of the second slider to a larger scale.

As the first and second sliders 211 and 311 further move, the disk drive 2 soon enters the state shown in FIGS. 13A through 13D. As shown in FIG. 13A, the second slider 311, which has been moving in the direction 10A, has now reached its rearmost position in the outer casing 90. On the other hand, the first slider 211, which has gone the distance A+α from the position shown in FIG. 12A in the direction 10B, has now reached its frontmost position in the outer casing 90. As shown in FIG. 13D, the pin 380t of the sensor lever 380 has been guided by the cam groove 311t of the second slider 311 and rotated to the direction 380B, thereby depressing the mount completion sensor 815. As a result, the driver 281 reverses its rotational direction and starts to rotate to the opposite direction.

Figure 13C:
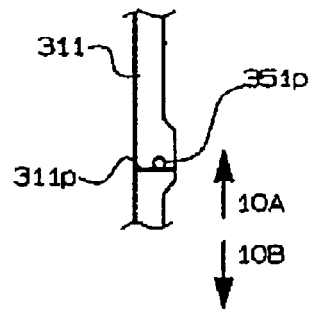
Figure 13B:
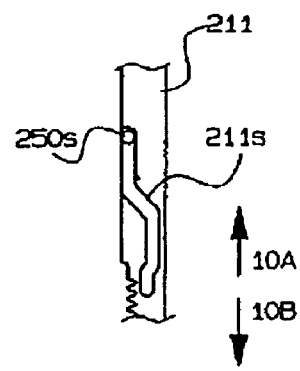
FIG. 13B is a plan view illustrating a portion of the first slider to a larger scale.

At this point in time, the pin 351p of the second rocker 351 has been fully pressed by the stepped portion 311p of the second slider 311 in the direction 10A as shown in FIG. 13C. Accordingly, as shown in FIG. 13A, the pin 351d of the second rocker 351 pushes the disk 10 approximately to a point that the center hole 10a of the disk 10 is totally outside of the front bezel 80. In this manner, the second rocker 351 can eject the disk 10 just as intended by utilizing not only the force applied from the torsion spring 356 but also the driving force on the second slider 311. For that reason, even if the disk drive 2 is mounted vertically so that its rearmost side faces the direction 10A, a predetermined portion of the disk 10 can be ejected just as intended, e.g., until the center hole 10a of the disk 10 is totally exposed out of the disk drive 2. In addition, as described above, the mount completion sensor 815 can also sense whether the disk 10 has been ejected successfully.

Furthermore, as shown in FIG. 13A, the end 410c of the slider coupling 410 presses the pin 540c of the third rocker 540, thus rotating the third rocker 540 to the direction 540A. As a result, the pin 540u of the third rocker 540 depresses the pull-in start sensor 814. A force has already been applied to the third rocker 540 in the direction 540A. However, the pull-in start sensor 814 can be depressed by the slider coupling 410 without fail. Accordingly, even if the pull-in start sensor 814 has been depressed too strongly or if the third rocker 540 has been partially distorted and cannot rotate so easily, the third rocker 540 still can return to its home position easily and the pull-in start sensor 814 can be depressed as intended.

In the state shown in FIG. 13A, the driver 281, which has reversed its rotational direction, starts to move the first slider 211 in the direction 10A. Then, as shown in FIG. 9A, the first slider 211 goes the distance α in the direction 10A while the second slider 311 goes in the direction 10B. These directions are opposite to the directions in which the first and second sliders 211 and 311 have been moving. As soon as the end 211u of the first slider 211 depresses the initial state detector 816, the driver 281 stops rotating. While the disk drive 2 is changing from the state shown in FIGS. 13A through 13D to the state shown in FIGS. 9A through and 9D, the stepped portion 311p of the second slider 311 also moves in the direction 10B. However, as the force is being applied from the torsion spring 356 to the second rocker 351 in the direction 351A, the bent portion 351o of the second rocker 351 is still in contact with, and stops at, the disk guide 390. Accordingly, as shown in FIG. 9C, the pin 351p does not follow the stepped portion 311p but only the second slider 311 moves in the direction 10B while leaving the second rocker 351 where it is. In this manner, the second rocker 351 remains at the position contributing to the ejection of the disk 10 while being pressed in the direction 351A. As a result, the expanded portion 351g of the second rocker 351 can guide a disk 10 to be inserted next time.

As described above, when the disk 10 is loaded into this disk drive 2, the driver 281 moves the first slider 211 for the distance A in the direction 10A and the second slider 311, interlocked with the first slider 211, in the direction 10B. As a result of these operations, the first rocker 250 pulls in the disk 10 from its insertion position to the position where the disk 10 is supposed to be rotated. Also, the base 100 is raised, thereby mounting the disk 10 onto the turntable 110b of the spindle motor 110.

On the other hand, when the disk 10 is unloaded from this disk drive 2, the first slider 211 goes the distance A+α in the direction 10B, while the second slider 311, interlocked with the first slider 211, goes in the direction 10A. As a result of these operations, the base 100 is lowered, thereby dismounting the disk 10 from the turntable 110b. Also, the second rocker 351 pushes the disk 10 from the position where the disk 10 was rotated to its ejected position. After the disk 10 has been ejected, the first slider 211 goes the distance α again in the direction 10A and the second slider 311 also goes in the direction 10B. In this manner, the first and second sliders 211 and 311 return to their home positions. In the meantime, the second rocker 351, being pressed in the direction in which the disk is ejected, does not follow the second slider 311 moving in the direction 10B but remains at the position contributing to the ejection of the disk 10.

Suppose not the disk 10 of a regular size (e.g., having a diameter of about 12 cm) but a second disk 11 of a non-regular size (e.g., having a diameter of about 8 cm, which is two-thirds of the regular size) has been inserted by mistake by the user through the disk inserting slot 80w of the front bezel 80 as shown in FIG. 9A. Even if the second disk 11 happens to be inserted almost entirely through either the left or center portion of the disk inserting slot 80w, the disk 11 is pushed back to the user due to the rotational force applied from the torsion spring 356 onto the second rocker 351 in the direction 351A once the user lets the disk 11 off his or her hands. This is because the second rocker 351 is so constructed as not to start to rotate until the force applied from the torsion spring 356 thereto reverses its direction. Also, even if the second disk 11 is inserted along the guide plane 720d of the guide 720 through the right portion of the disk inserting slot 80w, the second disk 11 is also rejected due to the spring force of the torsion spring 356. This is because the outer periphery of the disk 11 never fails to come into contact with the bent portion 351i or the pin 351d of the second rocker 350 and rotate the second rocker 351 to the direction 351B. As can be seen, even if a disk of a size smaller than the regular one has been inserted by mistake, it is almost unimaginable that such a small disk should get stuck in the disk drive 2.

Furthermore, even if the disk drive 2 is mounted vertically so that the rearmost part thereof faces the direction 10A or that the right or left side thereof faces down, the disk drive 2 can always transport the disk 10 constantly. This is because the disk 10 being transported is always supported by the second rocker 351 and the guides 720 and 730 near the disk inserting slot 80w and then by the disk guide 390 and the third and first rockers 540 and 250 near the center portion of the disk drive 2.

As described above, the disk drive 2 of the second preferred embodiment can prevent the disk 10 inserted from getting scratched by having the disk 10 guided by the insertion guide 140 and the expanded portion 351g of the second rocker 351, and can also get the disk 10 ejected by the sliders 211 and 311 stably. In addition, just one sensor 814 can detect the two states by itself. Thus, the number of sensor required can be reduced and the disk drive can also have a reduced weight by using the supporting inner casing. Moreover, even if a disk of a small size has been inserted into this disk drive by mistake, the disk drive can reject such a disk by utilizing the spring force. Furthermore, the width of the disk drive can also be reduced by adjusting the disk guide. Also, since the disk being transported is always supported, the disk can be transported stably enough and the initial state thereof can be detected easily enough even if the disk drive is mounted vertically.

In the first and second preferred embodiments described above, the base is raised and lowered by the first and second sliders. However, the base does not have to be raised and lowered by the first and second sliders. For example, a third slider, which is interlocked with the first or second slider and has a cam groove engaged with the protrusion on the side face of the base, may be further provided and used in combination with the first or second slider to raise and lower the base. Such a third slider may be provided along the side faces of the base so as to interpose the base with respect to the first or second slider. Alternatively, the first or second slider and the third slider may be provided near two adjacent side faces of the base.

Also, in the preferred embodiments described above, the disk is mounted or dismounted onto/from the turntable by raising and lowering the base entirely. Optionally, these operations may also be performed by raising and lowering just one side face of the base. Specifically, when one side face of the base is raised and lowered by the first or second slider, the base needs to be supported so as to rotate on a bearing axis on the opposite side face thereof. In such a structure, as the sliders move, the turntable rotates on the bearing axis of the base, i.e., is sometimes tilted and sometimes parallel with respect to the disk plane. Accordingly, the disk can also be mounted and dismounted onto/from the turntable.

The disk drive according to any of the preferred embodiments of the present invention described above does not use any roller as a means for transporting the disk inserted, and can have a reduced width. In addition, the disk drive transports the disk on only the two rockers and gets the two rockers driven, and the base raised and lowered, by the sliders, thus simplifying the disk drive structure significantly. Thus, the present invention provides a lightweight disk drive at a lower cost.

Also, by getting the side faces of the base raised and lowered by the sliders, the disk drive can mount and dismount the disk onto/from the turntable without using any clamper. Particularly when the disk drive gets the spindle motor and the base supported, raised and lowered perpendicularly by a pair of interlocked sliders, the disk drive can hold and rotate the disk even more stably.

Moreover, in the disk drive according to the preferred embodiments described above, the pair of sliders, first and second rockers and slider coupling are all disposed outside of the projection area of the base. Thus, almost all members of the disk drive can be arranged under the turntable. In addition, since the disk drive uses the spindle motor of a self-locking type, no damper needs to be provided over the disk inserted. As a result, this disk drive can have a reduced thickness.

Furthermore, in this disk drive, the base is disposed close to the front side, and the circuit board and connectors for external units can be disposed behind the base. Thus, the disk drive can be connected to an external circuit easily and yet the circuit board can have a reduced area. Also, the sliders are moved substantially in the direction in which the disk is transported, and may also be moved compulsorily by an externally applied force. Accordingly, in case of emergency, the disk can be ejected easily.

Furthermore, the outer casing of the disk drive has a notched portion to further reduce the size of the disk drive. Even so, a portion of the first rocker is engaged with the guide of the outer casing, thereby allowing the first rocker to rotate stably without being raised unintentionally. Also, since the second rocker is operated by using a reversible spring, the load on the driver thereof is very small although the second rocker should be rotated to a great degree.

Moreover, even if the base has been deformed, a leaf spring provided for the driver support can rectify the deformation. Thus, the base can keep its horizontal balance, thereby holding and rotating the disk stably. Furthermore, the partition of the base closes up the disk inserting slot while the disk is rotating. Accordingly, no disk can be inserted into the disk drive by mistake.

Furthermore, when the user inserts the disk into this disk drive, the disk inserted is guided by the insertion guide and the expanded portion of the second rocker in such a manner as to avoid contact with any member on the base. Accordingly, the disk inserted does not get scratched.

Also, the second slider pushes the second rocker to the limit until the disk being ejected reaches a predetermined position. Furthermore, after the disk has been ejected, the second slider goes back a predetermined distance to its home position with the second rocker left where it is. Thus, when another disk is inserted into this disk drive next time, the disk can be guided by the expanded portion of the second rocker easily. Moreover, just one sensor can be used as both mount completion sensor and eject completion sensor. Accordingly, the operations described above are realized without increasing the number of sensors needed.

Furthermore, a stiff supporting inner casing with bent portions is provided inside the outer casing, thus contributing to increasing the mechanical strength and decreasing the weight of the disk drive.

Also, even if a disk of a size smaller than the regular size has been inserted into this disk drive by mistake, such a disk is always rejected by the spring force applied to the second rocker.

Furthermore, the disk guide is movable between the positioning state and the standby state, thus optimizing the trace of the disk being transported and reducing the width of the disk drive at a time. Also, the disk being transported is always supported. Accordingly, even if the disk drive is mounted vertically, the disk drive can also transport the disk inserted stably.

Furthermore, in unloading the disk, the slider coupling pushes the third rocker back to its home position. Thus, the initial state detector can be depressed by the third rocker just as intended, thereby avoiding erroneous detection of the initial state.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A disk drive comprising:
    a base including a spindle motor, the spindle motor having a turntable to mount a disk thereon;
    a first rocker, which rocks substantially parallelly to the turntable and which pulls in the disk, inserted externally, to an internal position where the center of the disk is aligned with that of the spindle motor,
    a second rocker, which also rocks substantially parallelly to the turntable and which unloads the disk from the internal position to a point where the disk is exposed at least partially;
    first and second sliders, which are engaged with the first and second rockers to make the first and second rockers pull in and unload the disk, respectively, and which reciprocate in two directions substantially parallel to the turntable,
        wherein the first and second rockers and the first and second sliders are all located under the turntable, and
        wherein at least one of the first and second sliders supports a side face of the base and raises and lowers the side face by reciprocating in the two directions; and
    an outer casing that includes: a first space in which the base is stored; a notched portion that is adjacent to the first space and that extends in the directions in which the first and second sliders reciprocate; and a second space that is provided over the first space and the notched portion and that allows the disk to rotate therein,
        wherein the first rocker is rotated in the second space located over the notched position.

2. The disk drive of claim 1, wherein the spindle motor comprises a hub that engages with a center hole of the disk, and
    wherein the outer casing includes a convex portion, which forms a space that will receive a portion of the hub when the base is raised.

3. A disk drive comprising:
    a base including a spindle motor, the spindle motor having a turntable to mount a disk thereon;
    a first rocker, which rocks substantially parallelly to the turntable and which pulls in the disk, inserted externally, to an internal position where the center of the disk is aligned with that of the spindle motor;
    a second rocker, which also rocks substantially parallelly to the turntable and which unloads the disk from the internal position to a point where the disk is exposed at least partially;
    first and second sliders, which are engaged with the first and second rockers to make the first and second rockers pull in and unload the disk, respectively, and which reciprocate in two directions substantially parallel to the turntable,
        wherein the first and second rockers and the first and second sliders are all located under the turntable, and
        wherein at least one of the first and second sliders supports a side face of the base and raises and lowers the side face by reciprocating in the two directions; and
    a reversible spring that applies a force to the second rocker to rotate the second rocker bidirectionally on the axis thereof,
        wherein when at least the second rocker is disengaged from the second slider, the reversible spring applies the force to the second rocker to rotate the second rocker to a direction in which the disk is unloaded.

4. A disk drive comprising:
    a base having a side face including a spindle motor, the spindle motor having a turntable to mount a disk thereon, the side face including a protrusion; and
    a first rocker, which rocks substantially parallelly to the turntable and which pulls in the disk, inserted externally, to an internal position where the center of the disk is aligned with that of the spindle motor;
    a second rocker, which also rocks substantially parallelly to the turntable and which unloads the disk from the internal position to a point where the disk is exposed at least partially;
    first and second sliders, which are engaged with the first and second rockers to make the first and second rockers pull in and unload the disk, respectively, and which reciprocate in two directions substantially parallel to the turntable,
        wherein the first and second rockers and the first and second sliders are all located under the turntable,
        wherein at least one of the first and second sliders supports a side face of the base and raises and lowers the side face by reciprocating in the two directions;

wherein at least one of the first and second sliders includes a cam groove for guiding the protrusion in such a manner as to raise and lower the side face by reciprocating in the two directions;

a driver for moving at least one of the first and second sliders; and a driver support for supporting the driver near the base, wherein the driver support includes a leaf spring for applying a force to the base in such a direction that the protrusion on the side face of the base comes into contact with the cam groove of the first or second slider.

5. A disk drive comprising:

a base including a spindle motor, the spindle motor having a turntable to mount a disk thereon;

a first rocker, which rocks substantially parallelly to the turntable and which pulls in the disk, inserted externally, to an internal position where the center of the disk is aligned with that of the spindle motor;

a second rocker, which also rocks substantially parallelly to the turntable and which unloads the disk from the internal position to a point where the disk is exposed at least partially;

first and second sliders, which are engaged with the first and second rockers to make the first and second rockers pull in and unload the disk, respectively, and which reciprocate in two directions substantially parallel to the turntable, wherein the first and second rockers and the first and second sliders are all located under the turntable, wherein at least one of the first and second sliders supports a side face of the base and raises and lowers the side face by reciprocating in the two directions, wherein the second rocker is engaged with, and driven by, the second slider until the disk being unloaded reaches the point where the disk is exposed at least partially, wherein in loading the disk, the disk drive slides, for a distance A, the first slider in a first direction and the second slider in a second direction opposite to the first direction, respectively, makes the first rocker pull in the disk to the internal position while the first and second sliders are being slid, and raises the base, thereby mounting the disk on the turntable, wherein in unloading the disk, the disk drive slides, for a distance A+α, the first and second sliders in the second and first directions, respectively, and lowers the base while the first and second sliders are being slid, thereby dismounting the disk from the turntable and getting the disk ejected by the second rocker, and wherein after the disk has been ejected, the disk drive slides, for a distance α, the first and second sliders in the first and second directions, respectively, without moving the second rocker, thereby recovering its initial state.

6. The disk drive of claim 5, wherein the second rocker is disposed at such a position as pushing back a second disk that has been inserted into the disk drive by mistake, the second disk having a diameter two-thirds as long as a regular diameter of the disk.

7. The disk drive of claim 6, further comprising a first sensor for sensing whether the disk has been pulled in and whether the disk has been mounted on the turntable, wherein the first sensor further senses whether the disk has been ejected or whether the disk drive has recovered its initial state.

8. A disk drive comprising:

a base including a spindle motor, the spindle motor having a turntable to mount a disk thereon;

a first rocker, which rocks substantially parallelly to the turntable and which pulls in the disk, inserted externally, to an internal position where the center of the disk is aligned with that of the spindle motor;

a second rocker, which also rocks substantially parallelly to the turntable and which unloads the disk from the internal position to a point where the disk is exposed at least partially;

first and second sliders, which are engaged with the first and second rockers to make the first and second rockers pull in and unload the disk, respectively, and which reciprocate in two directions substantially parallel to the turntable, wherein the first and second rockers and the first and second sliders are all located under the turntable, wherein at least one of the first and second sliders supports a side face of the base and raises and lowers the side face by reciprocating in the two directions, a disk guide, which is disposed so as to face the first rocker with the disk interposed between the disk guide and the first rocker and to regulate the directions in which the disk is transported; and a third rocker for pressing the outer periphery of the disk against the first rocker and the disk guide, wherein the disk is positioned on the spindle motor by bringing the disk into contact with the disk guide and the first rocker.

9. The disk drive of claim 8, wherein the disk guide is disposed so as to avoid contact with the disk being inserted and interlocked with the second slider in such a manner as to come into contact with the disk, and position the disk on the spindle motor, while the disk is being pulled in, and to separate from the disk after the disk has been mounted on the spindle motor.

10. The disk drive of claim 9, wherein even if the disk drive is disposed so that the disk guide is located under the disk being inserted, the disk guide is still interlocked with the second slider in such a manner as to hold the disk thereon and position the disk on the spindle motor.

11. The disk drive of claim 8, wherein even if the disk drive is disposed so that the third rocker is located under the disk being inserted, the third rocker still applies a force to the disk in such a direction as to press the disk against the first rocker and the disk guide.

12. The disk drive of claim 8, wherein the third rocker is interlocked with the slider coupling and separated from the disk after the disk has been mounted on the turntable.

13. The disk drive of claim 8, further comprising a disk insertion sensor for detecting the operation of the third rocker, being rotated by the disk being inserted, when the disk reaches a predetermined position, wherein in response to a detection signal supplied from the disk insertion sensor, the first and second sliders start to pull in the disk.

14. The disk drive of claim 13, wherein the third rocker is interlocked with the slider coupling, and wherein the disk drive moves the third rocker back to its home position by moving the slider coupling while the disk is being unloaded.

* * * * *